(12) United States Patent
Tang et al.

(10) Patent No.: US 8,073,203 B2
(45) Date of Patent: Dec. 6, 2011

(54) GENERATING EFFECTS IN A WEBCAM APPLICATION

(75) Inventors: Shih-Min (Stanley) Tang, Tainan County (TW); Ming-Jun Chen, Tainan (TW); Chih-Yu Cheng, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 904 days.

(21) Appl. No.: 12/103,133

(22) Filed: Apr. 15, 2008

(65) Prior Publication Data
US 2009/0257623 A1 Oct. 15, 2009

(51) Int. Cl.
*G06K 9/00* (2006.01)
(52) U.S. Cl. .......... 382/107; 382/284; 345/633
(58) Field of Classification Search .......... 382/100, 382/103, 107, 284; 345/629, 632, 633, 638; 348/584, 601
See application file for complete search history.

(56) References Cited

U.S. PATENT DOCUMENTS

| | | | | |
|---|---|---|---|---|
| 5,923,365 A * | 7/1999 | Tamir et al. | | 348/169 |
| 6,738,066 B1 * | 5/2004 | Nguyen | | 345/474 |
| 2002/0097247 A1 * | 7/2002 | Ohba | | 345/501 |
| 2003/0107585 A1 * | 6/2003 | Samuelson | | 345/629 |
| 2009/0262137 A1 * | 10/2009 | Walker et al. | | 345/629 |

* cited by examiner

*Primary Examiner* — Andrew W Johns
(74) *Attorney, Agent, or Firm* — Thomas, Kayden, Horstemeyer & Risley, LLP

(57) ABSTRACT

A system and a method for generating effects in a webcam application are provided. The method includes identifying a first object and a second object in a video image. The method also includes adding a first user-created object to the video image to create an altered video image and adding a second user-created object to the altered video image to further alter the altered video image. Other steps included are associating the second user-created object with the second object; identifying a movement of the second object; and moving the second user-created object in the altered video image in accordance with the association of the second user-created object with the second object. The first object is a static object, and the first user-created object is manually movable. The movement of the second user-created object in association with the second object is independent of a movement of the first user-created object.

37 Claims, 21 Drawing Sheets

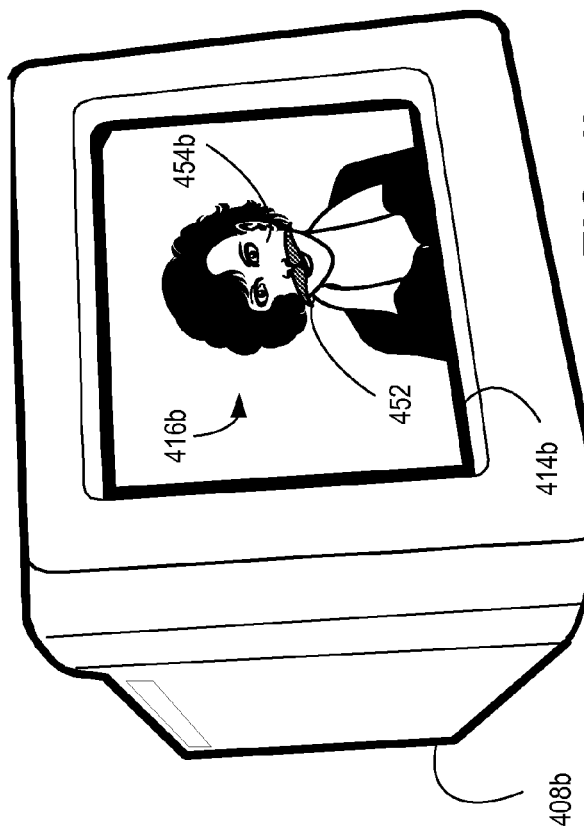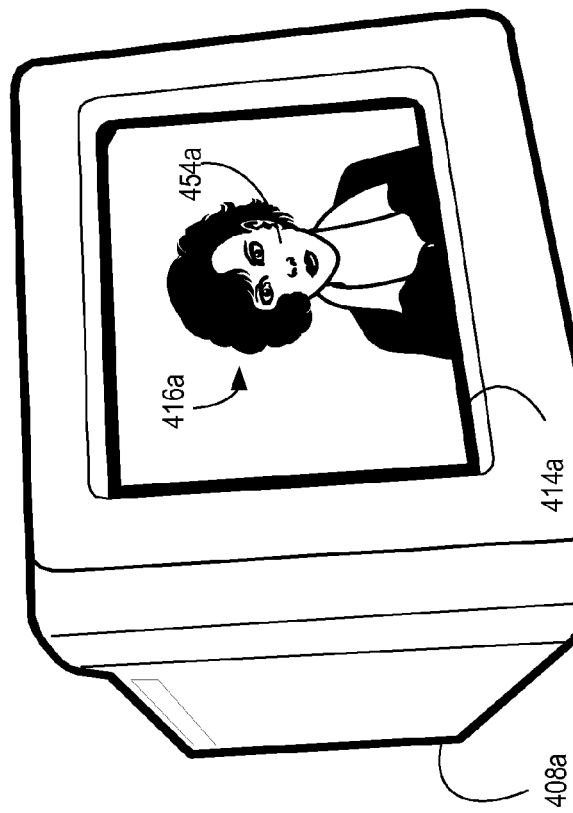

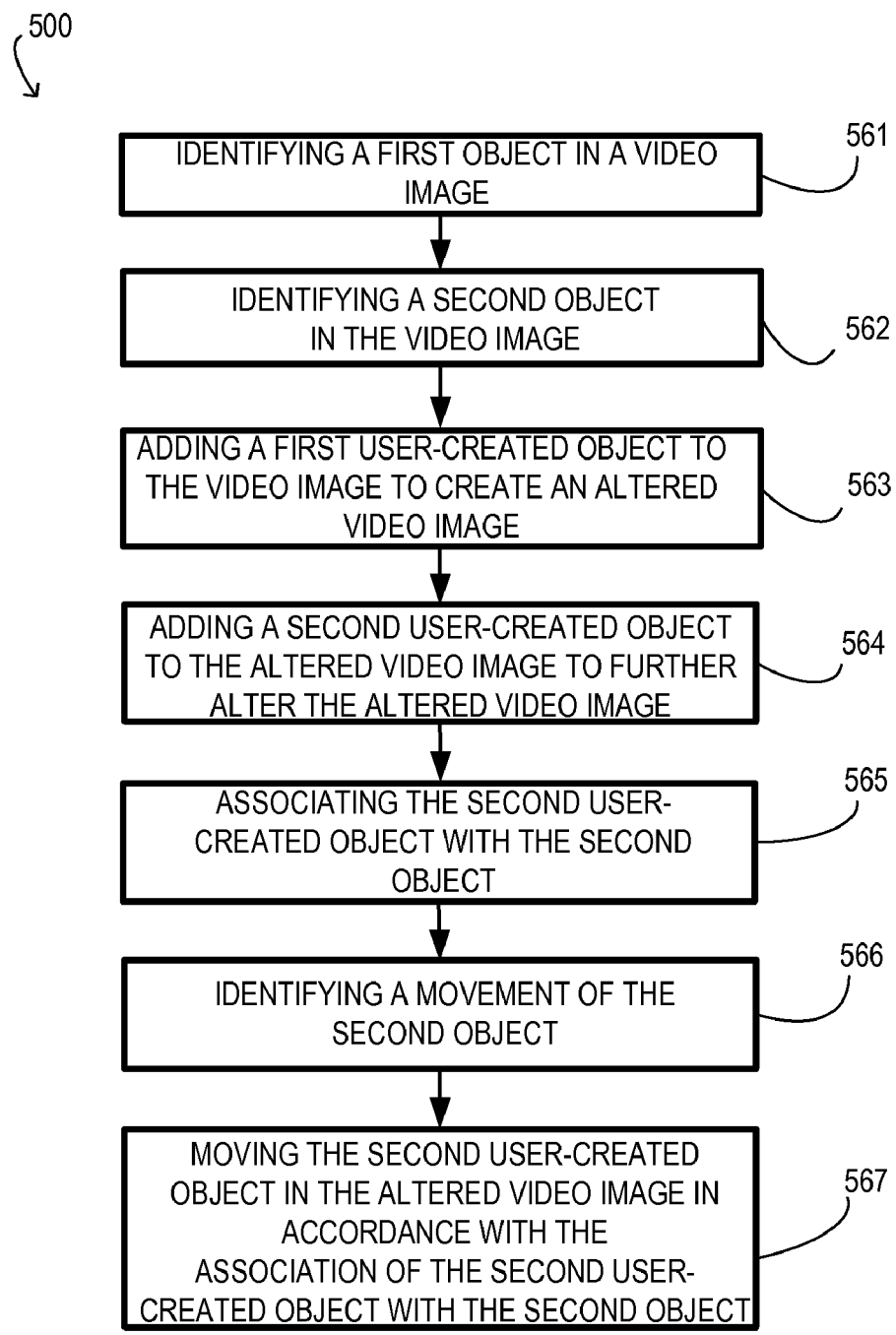

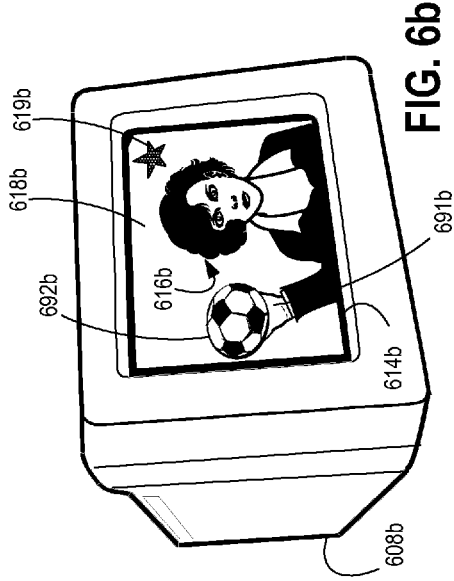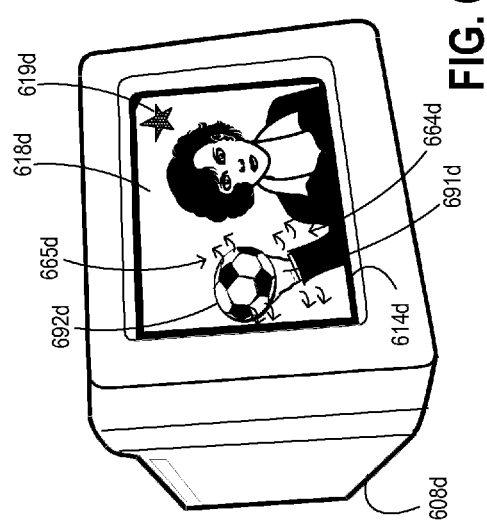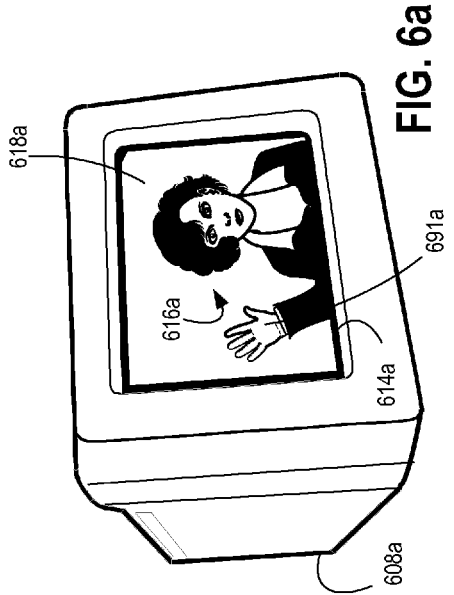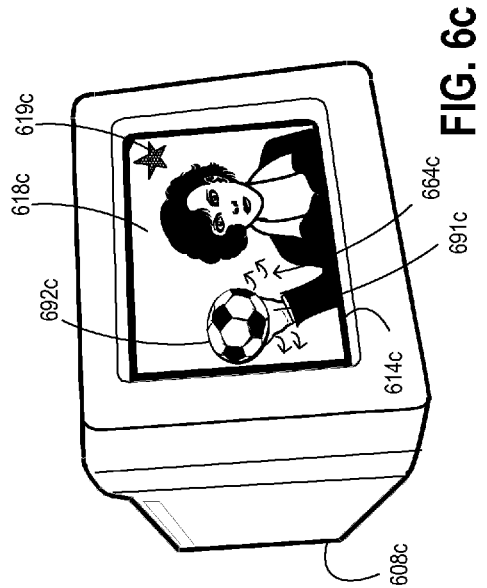

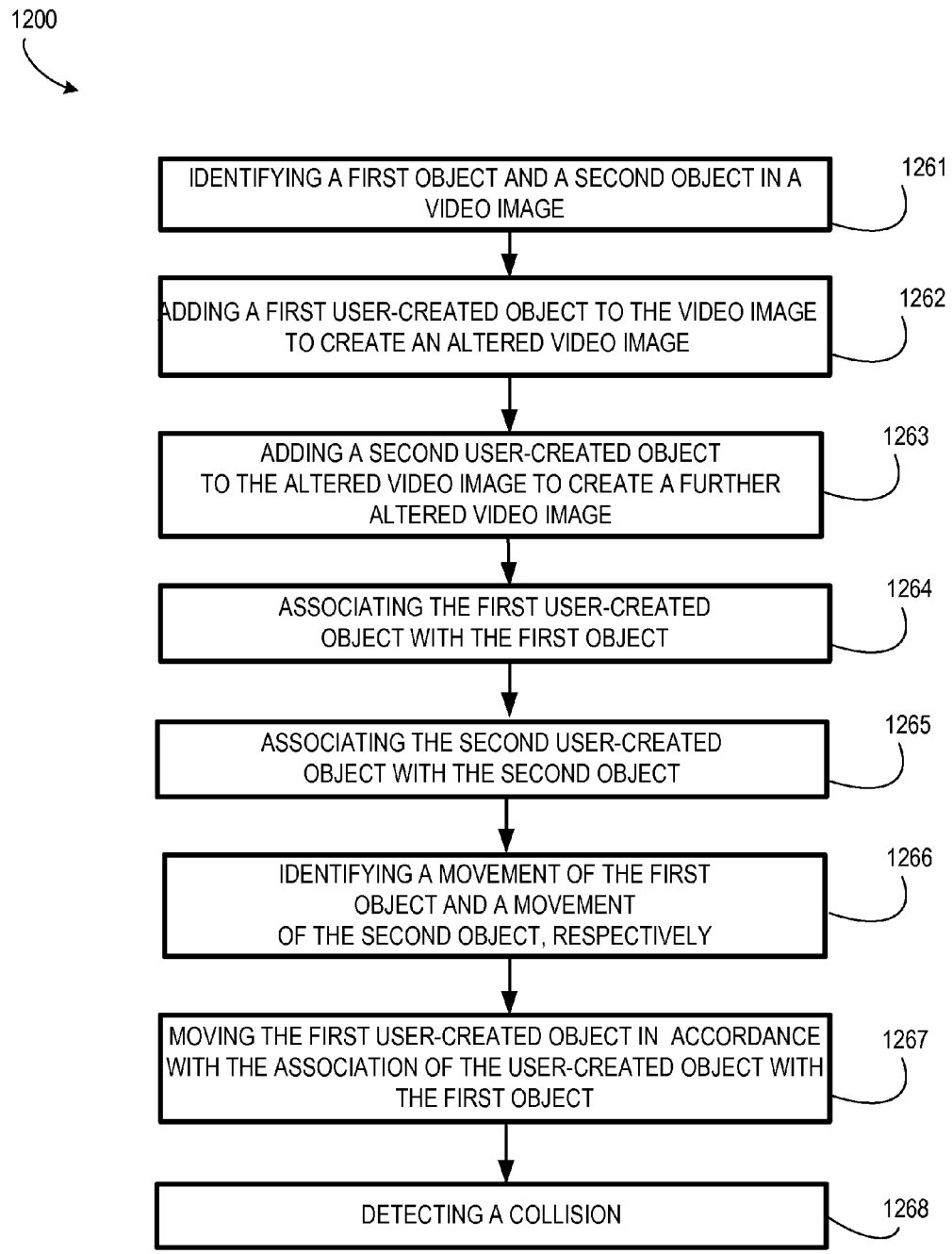

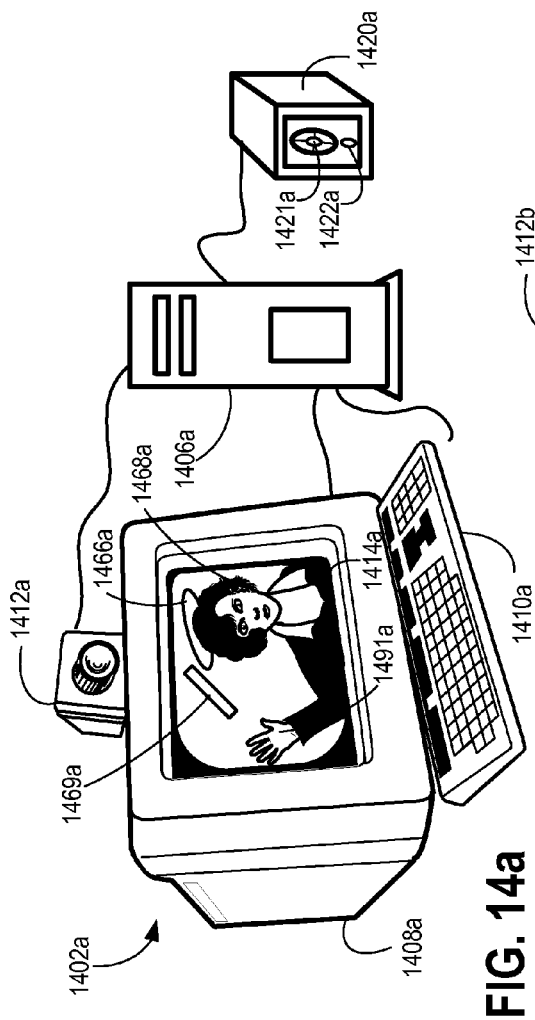
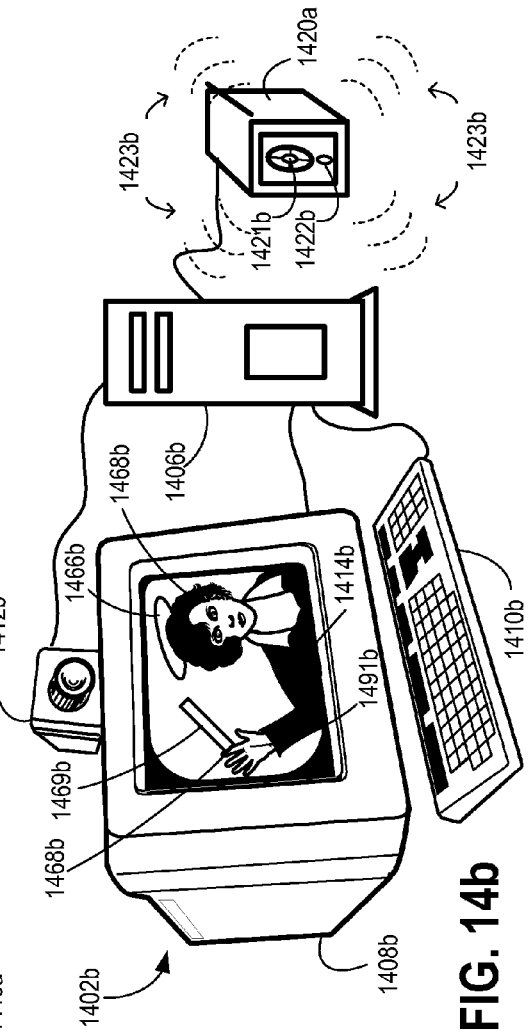
FIG. 14a
FIG. 14b

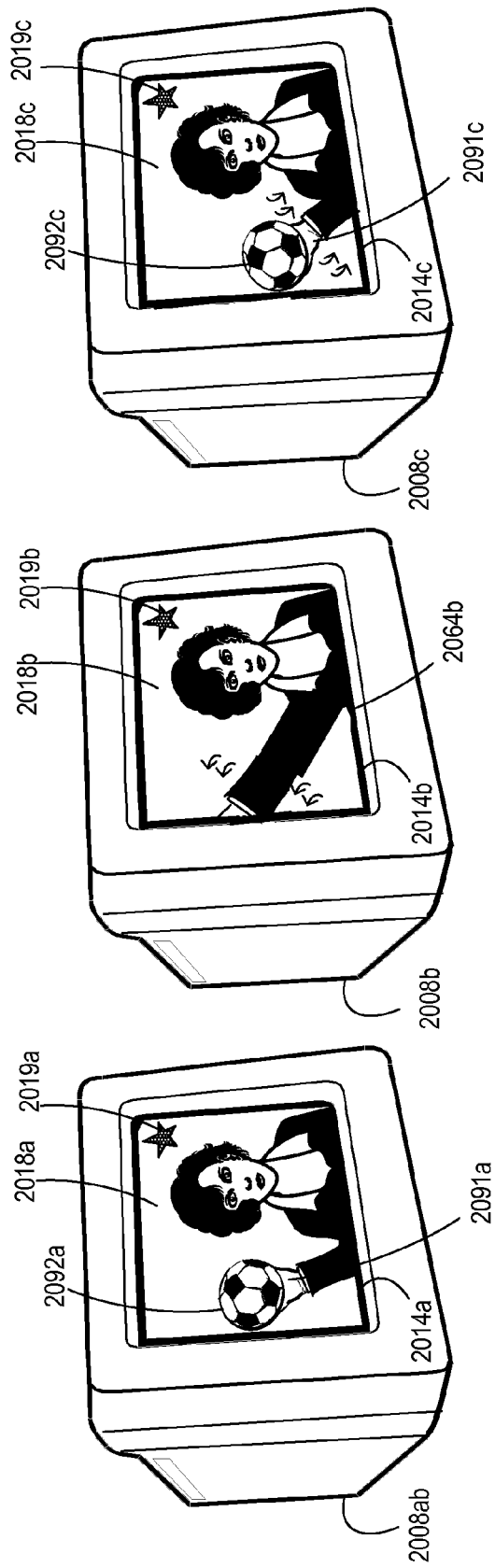

GENERATING EFFECTS IN A WEBCAM APPLICATION

TECHNICAL FIELD

The present invention is generally related to video and audio technology and, more particularly, is related to a system and method for generating effects in a webcam application.

BACKGROUND

In recent years, a growing number of personal computers and interactive television systems are equipped with digital video cameras. These cameras may be configured as a web camera or "webcam." The webcam captures a continual stream of video images and broadcasts the images on the monitor of a personal computer. Such cameras may be used for at least one-way video communication, two-way video communication (videoconferencing, chatting, etc), or broadcast video communication. The communication may be displayed on the monitor or can be transmitted through a network such as a local area network (LAN) or the Internet.

SUMMARY

Embodiments of the present invention provide a system or method for generating effects for a webcam application. In one embodiment, a method for generating effects for a webcam application is provided. In this regard, one embodiment of such a method, among others, can be broadly summarized by the following steps: identifying a first object in a video image; identifying a second object in the video image; adding a first user-created object to the video image to create an altered video image; adding a second user-created object to the altered video image to further alter the altered video image; associating the second user-created object with the second object; identifying a movement of the second object; moving the second user-created object in the altered video image in accordance with the association of the second user-created object with the second object. The first object may be a static object, and the first user-created object may be manually movable. The movement of the second user-created object in association with the second object may be independent of a movement of the first user-created object.

In another embodiment, a method for generating effects for a webcam application can be broadly summarized by the following steps: identifying a first object and a second object in a video image; adding a first user-created object to the first object to create an altered video image; adding a second user-created object to the second object to further alter the altered video image; associating the first user-created object with the first object; associating the second user-created object with the second object; identifying a movement of the first object and a movement of the second object, respectively; and moving the first user-created object in accordance with the association of the first user-created object with the first object.

Briefly described, in architecture, one embodiment of the system, among others, can be implemented as follows. A system for generating effects for a webcam application may comprise an identification module for identifying a first object in a video image; an addition module for adding at least one user-created object to the video image to create an altered video image; an association module associating the at least one user-created object with the first object; a motion detection module for identifying a movement of the first object; a movement module for moving the at least one user-created object in accordance with the association of the at least one user-created object with the first object in the altered video image; and a display module for displaying the altered video image.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 4a and 4b are diagrams illustrating an effect generated based on facial detection; FIG. 4a shows a diagram before an effect is generated; and FIG. 4b shows a user-created object associated with a detected face object.

FIG. 5 is a flow chart illustrating one embodiment of the method for generating effects in a webcam application.

FIGS. 6a, 6b, 6c, and 6d are diagrams illustrating certain aspects of the embodiment of the method illustrated in FIG. 5.

FIG. 12 is a flow chart illustrating yet another embodiment of the method for generating effects in a webcam application.

FIGS. 14a and b are diagrams illustrating other effects possible in addition to effects described in FIG. 12.

FIGS. 20a, 20b and 20c are diagrams illustrating certain aspects of the method for generating effects for a webcam application including tracking, removal and reinstatement features.

DETAILED DESCRIPTION OF EMBODIMENTS

Figure 1:
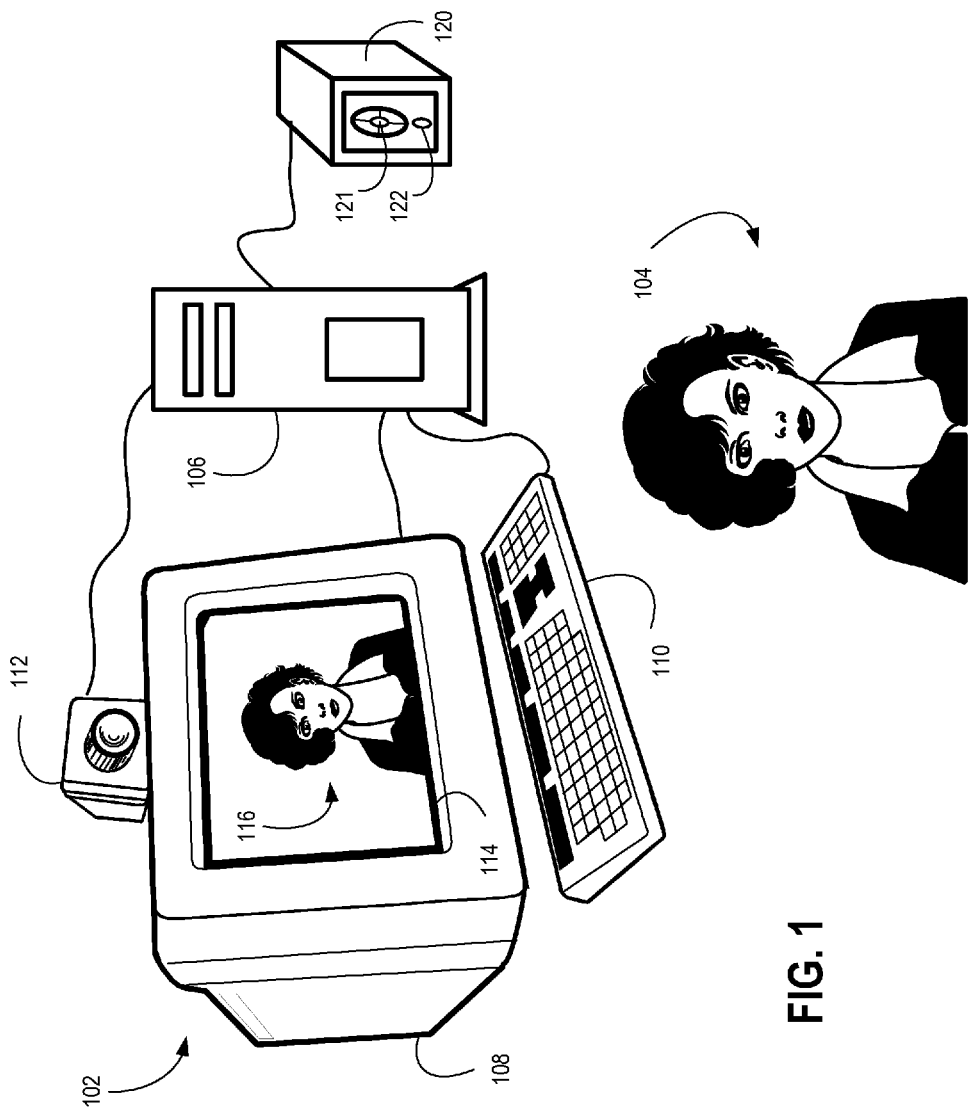
FIG. 1 is a schematic illustration of a webcam application on a computer system.

FIG. 1 illustrates a typical computer system 102 for using a webcam application and a user 104. The computer system 102 may include a webcam 112 and a monitor 108 coupled to the processing device 106. The computer system 102 may also include a keyboard 110 coupled to the processing device 106. Additionally, a mouse, although not pictured, may be coupled to the processing device 106. The monitor 108 may display a video image 114. When the computer system 102 is operating, a user image 116, which is part of a video image 114, may be captured using the webcam 112 and displayed on the monitor 108. The user image 116 in the video image 114 captured by the webcam 112 may be displayed in real time on the monitor 108. Also, an audio system 120 may be coupled to the processing device 106. The audio system 120 includes a speaker 121 and a microphone 122.

Figure 2:
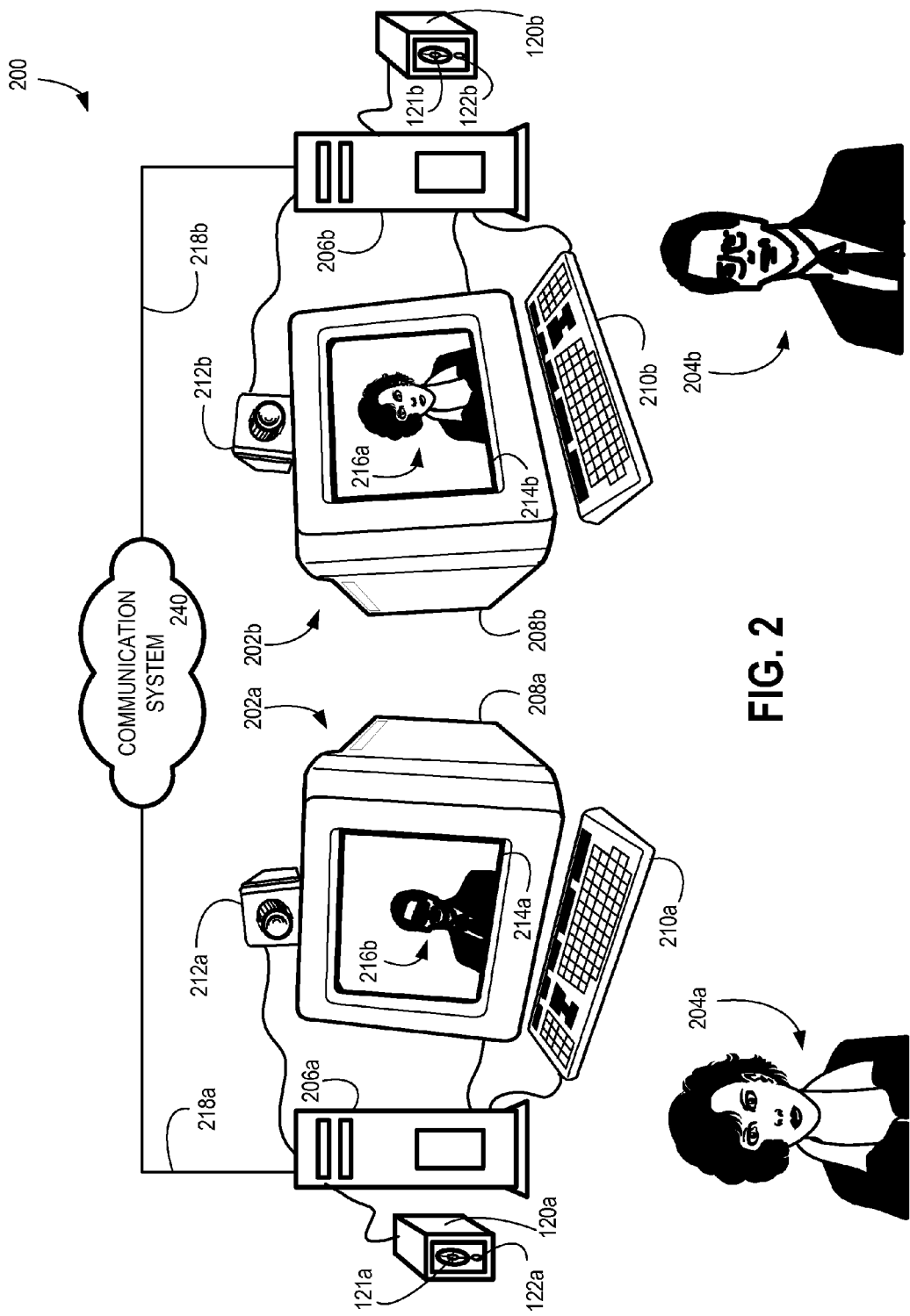
FIG. 2 is a schematic illustration of webcam applications on two communicating computer systems.

FIG. 2 illustrates two users 204a, 204b communicating by personal computers 202a, 202b over a communication system 240. The computer system 202a includes a webcam 212a and a monitor 208a coupled to the processing device 206a. The computer system 202a may also include a keyboard 210a and a mouse (not pictured) coupled to the processing device 206a. The monitor 208a can display a video image 214b. The computer system 202b includes a webcam 212b coupled to a processing device 206b and a monitor 208b also coupled to the processing device 206b. The computer system 202b may also include a keyboard 210b and a mouse (not pictured) coupled to the processing device 206b. The monitor 208b can display a video image 214a. Computer system 202a and computer system 202b are both coupled to a communication system 240.

The communication system 240 may be one of various types of communication systems including, for instance, the following: Internet, Intranet, Local Area Networks (LAN), Wide Area Networks (WAN) or an interconnected combination of these network types. In addition, the connectivity within the network 10 may be, for example, remote modem, Ethernet (IEEE 802.3), Token Ring (IEEE 802.5), Fiber Distributed Datalink Interface (FDDI), Asynchronous Transfer Mode (ATM), or any other communication protocol.

The computing systems linked to the communication system 240 are not limited to personal computers. The computer systems 202a, 202b may be a server, portable, hand-held, set-top box, personal digital assistant (PDA), a terminal, or any other desired type or configuration that has a camera and a displaying device such as a monitor or screen, etc. Depending on their functionality, the connected computer systems may vary widely in processing power, internal memory, and other performance aspects. Communications within the network and to or from the computer systems 202a, 202b connected to the communication system 240 may be either wired or wireless. Wireless communication is especially advantageous for portable or hand-held devices. The communication system 240 may include, at least in part, the world-wide public Internet which generally connects a plurality of users in accordance with a client-server model in accordance with the transmission control protocol Internet protocol (TCP/IP) specification.

When the computer system 202a is operating, a user image 216a of a user 204a may be captured using the webcam 212a and sent to the second computer system 202b via a communication system 240. The second computer system 202b can then display the communicated user image 216a in the video image 214a on the monitor 208b of the second computer system 202b. The user image 216a captured by the webcam 212a may be displayed in real time in the video image 214b on the monitor 208b of the second computer system 202b.

Likewise, a second user 204b can capture a second user image 216b using a second webcam 212b on a second computer system 202b and communicate that second user image 216b over the communication system 240 to the first user 204a. The second user image 216b in the video image 214a is displayed on the first monitor 208a of the first computer system 202a. The second user image 216b in the video image 214a captured by the webcam 212a may be displayed in real time on the second monitor 208b of the second computer system 202b. In this way, a first user 204a and a second user 204b can communicate using a webcam application.

Figure 3:
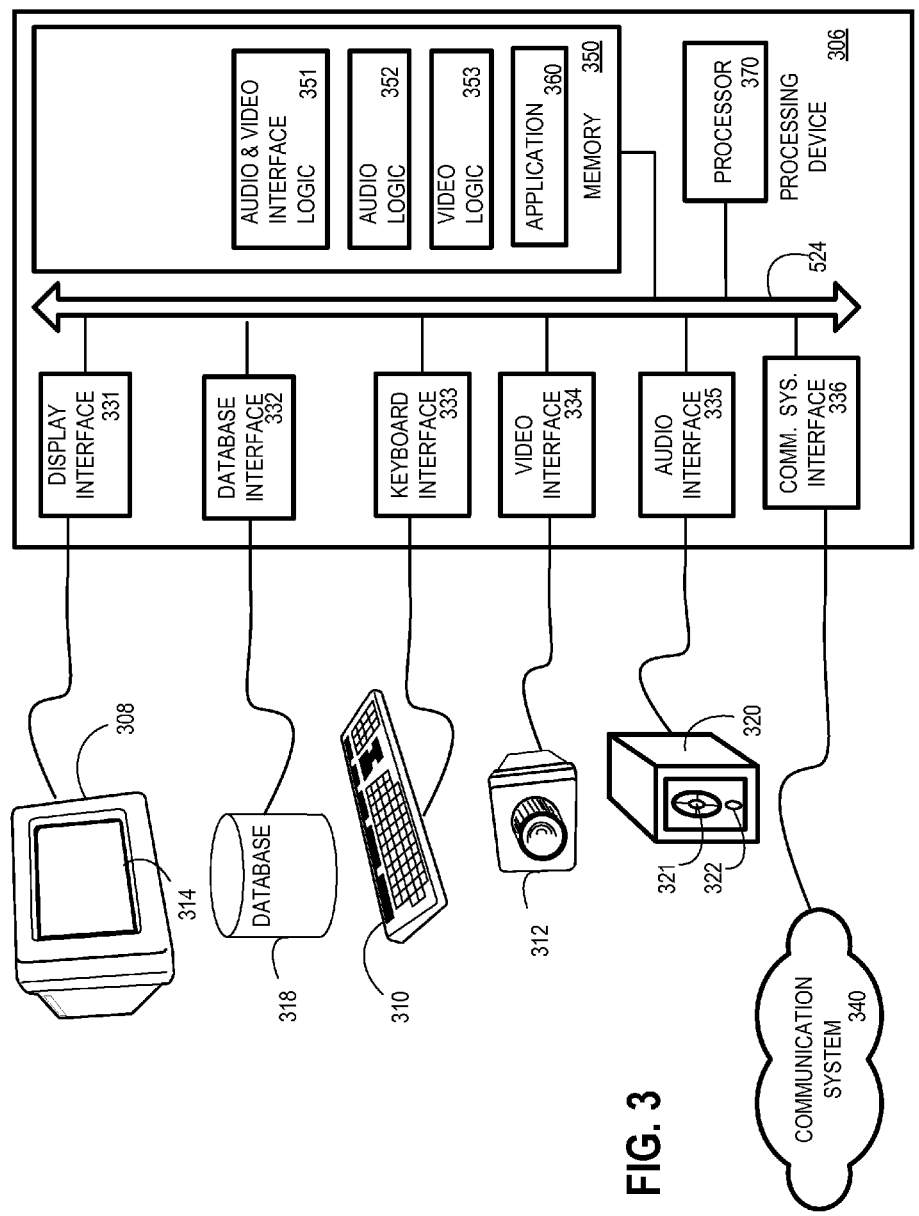
FIG. 3 is a schematic illustration of the webcam application on a computer system including the processing device and connections to peripheral devices.

FIG. 3 illustrates the connections between some peripheral devices and certain logic blocks in the processing device 306. FIG. 3 shows a monitor 308 displaying a video image 314 that is connected to the processing device 306 and specifically connected to a display interface 331 within the processing device 306. A database 318 may also be connected to a database interface 332 within the processing device 306. The database 318 may contain a preexisting bank of objects, and the objects may comprise image, text, video and audio files. Users can select a user-created object from the database 318. In other embodiments, the user-created object might also be generated by a user-drawing device (not pictured) or using a mouse (not pictured) for creating the user-created object. The user-created object may be a copied object. In other words, the user-created object may be a region of the video image that is copied and designated as an object.

Also shown is a keyboard 310 connected to a keyboard interface 333 within the processing device 306. A mouse (not pictured) could also be connected to the processing device 306 and would be connected to a mouse interface (not pictured) within the processing device 306. FIG. 3 further shows a webcam 312 connected to a video interface 333 within the processing device 306. An audio system 320 may optionally be connected to an optional audio interface 335 within the processing device 306. The audio system 320 depicted in FIG. 3 shows a speaker 321 and a microphone 322 for respectively outputting and inputting sound. The communication system interface 336 within the processing device 306 is connected to a communication system 340.

The interfaces (331, 332, 333, 334, 335 and 336) within the processing device 306 are connected to a memory 350 and a processor 370. In the memory 350 are stored audio & video interface logic 351, audio logic 352, video logic 353, and a webcam application program 360. The processor 370 executes the webcam application program 360 stored in memory 350 using data acquired from keyboard 310, webcam 312, microphone 322 within in the audio system 320, communication system 340, a mouse (not pictured), other data within memory or from other additional peripheral devices.

Some webcam applications utilize facial detection for determining a portion of the video image that may correspond to a face and then associate an object with the detected face. For example, in FIG. 4a, a monitor 408a similar to the monitor 108 in FIG. 1 from a computer system 102 may be illustrated. A video image 414a including a user image 416a may be captured by webcam and displayed on a monitor 408a. A facial detection technique may be used to detect the portion of the user image 416a that is the face 454a. In FIG. 4b, an object, a mustache 452, is associated with the detected face 454b and displayed on the face 454b of the user image 416b in the video image 414b on the monitor 408b. Various facial detection techniques exist. For example, a facial detection algorithm might implement the face-detection task as a binary pattern-classification task. That is, the content of a given part of an image may be categorized into features such as two eyes, a nose and mouth, and then a classifier trained on example faces may decide whether that particular region of the image is a face.

The flow chart of FIG. 5 shows the architecture, functionality, and operation of a possible implementation of one embodiment of the method 500 as software for generating effects for a webcam application. In this regard, each block represents a module, segment, or portion of code, which comprises one or more executable instructions for implementing the specified logical function(s). It should also be noted that in some alternative implementations, the functions noted in the blocks may occur out of the order illustrated in FIG. 5. For example, two blocks shown in succession in FIG. 5 may in fact be executed substantially concurrently or the blocks may sometimes be executed in the reverse order, depending upon the functionality involved. This method 500 in FIG. 5 may also be adapted to generate effects for another application using a different type of camera and is not limited to a webcam.

In block 561 of FIG. 5, a first object may be identified in a video image. The first object may be identified using various techniques such as facial detection (if the object is a face), motion detection (if the object moves), frame comparison analysis, edge detection analysis, or one of a variety of other object identification techniques. For example, in one technique, the difference between a frame and a next frame may be found. If the difference is less than a threshold, the video may be assumed to be static. Otherwise, the video may be assumed to be dynamic. In some embodiments, the first object may be a background region, and this background region may be static. The video image may be analyzed and divided into a background region and a dynamic region. The background region can be a static region which includes the same or similar frames over a predetermined period of time. Or, the background region may be captured first as a reference image, and then this reference image may be compared to the video image that includes the reference image to determine a foreground region. Also, the background region may be identified by one of a variety of other identification techniques instead.

Some other examples of various techniques for object detection or background detection are described in the following patents which are hereby incorporated herein by reference in their entirety: U.S. Pat. No. 5,748,775 issued to Tsuchikawa et al. and entitled "Method and Apparatus for Moving Object Extraction Based on Background Subtraction"; U.S. Pat. No. 4,075,604 issued to Mario Marco Degasperi and entitled "Method and Apparatus for Real Time Image Recognition"; U.S. Pat. No. 6,711,279 B1 issued to Hamza et al. and entitled "Object Detection"; U.S. Pat. No. 6,088,468 issued to Ito et al. and entitled "Method and Apparatus for Sensing Object Located Within Visual Field of Imaging Device"; and U.S. Pat. No. 5,721,692 issued to Nagaya et al. and entitled "Moving Object Detection Apparatus."

In block 562, a second object in the video image may be identified. Like the first object, the second object may be identified by facial detection (if the object is a face), motion detection (if the object moves), frame comparison analysis, edge detection analysis, or one of a variety of other object identification techniques.

In block 563, a first user-created object may be added to the video image to create an altered video image. The first user-created object might be drawn by the user or selected by a program, a user, a correspondent, etc. from a preexisting bank of objects in a database. The first user-created object may also be generated by a program or automatically by the webcam application. Also, the first user-created object may be selected from the preexisting bank of objects and then modified by a user, program, correspondent, etc. Further, the first user-created object might be text.

The first user-created object may have various characteristics. One such characteristic may be a degree of deformability. In other words, the first user-created object could be susceptible to a high level of change in its shape or a low level of change in its shape depending upon its degree of deformability. Alternatively, the deformability could be of a compression-type or a bending-type. Another characteristic of the user-created object might be temporal morphing. In other words, the first user-created object may change over time. For example, the first user-created object might be an image of a cut flower, and if displayed for a certain amount of time, the cut flower might wilt. Another characteristic of the first user-created object could be responsiveness to a stimulus.

Also described in FIG. 5 is block 564, in which a second user-created object may be added to the altered video image to further alter the altered video image. The second user-created object may also have the characteristics described above with respect to the first user-created object. In addition, like the first user-created object, the second user-created object might be drawn by the user or selected by a program, a user, a correspondent, etc. from a preexisting bank of objects in a database. The second user-created object might also be generated by a program or automatically by the webcam application. Also, the second user-created object could be selected from the preexisting bank of objects in a database and then modified by a user, program, correspondent, etc. Further, the second user-created object might be text.

In block 565 of FIG. 5, the second user-created object may be associated with the second object. In certain implementations of the method, the association might occur automatically or could occur according to the specification of a user, or by a hybrid of the two. The association between the user-created object and the first object may be determined by relative locations of the frames of both objects.

In block 566, a movement of the second object may be identified. Numerous motion detection techniques exist for detecting (i.e. identifying) movement in a video image and may be utilized to implement certain features. For example, motion might be detected by comparing a current image with a reference image and counting the number of different pixels. Since images may naturally differ due to factors such as varying lighting, camera flicker, and CCD dark currents, the motion detection might include pre-processing to reduce the number of false positives (detecting motion when there is none).

Block 566 may also include defining a second object motion vector based on based on the movement of the second object. This vector may include information such as the direction that the second object is moving and the velocity of the second object. Direction and velocity may be determined by a frame comparison analysis by comparing the location of the second object in different frames. An additional block that may be included in the method may be modifying the second user-created object depending on the second object motion vector described above.

Alternatively, motion may be detected based on the detection of edges in video images (i.e. abrupt transitions in color or brightness that delineate one region from another. Edge detection processes and stores transitions instead of a large number of pixels, and it may take advantage of the high degree of correlation between pixels in a video image. In other words, large regions of pixels may tend to share similar values. An example of an edge detection system may be disclosed in U.S. Pat. No. 4,879,716 issued to Aschwanden et al. Still another possible motion detection technique may be subtracting the value of each pixel of an incoming frame from the corresponding pixel in a reference frame, and accumulating the resulting difference. Motion would be indicated when the accumulated difference exceeds some predetermined amount. One reference describing various techniques may be U.S. Pat. No. 6,493,041 issued to Hanko et al. Motion detection techniques other than those described here may also be suitable for use.

A motion vector may be used to describe the movement of the second object. In other words, the movement of the second object can have a direction and a velocity. The direction and velocity may be represented as a vector that describes the motion.

Another block included in the method 500 illustrated in FIG. 5 is block 567. In block 567, the second user-created object may be moved in accordance with the association of the second user-created object with the second object. As discussed above, the movement of the second object in the video image may be determined through motion detection techniques, and once the movement has been identified, the second user-created object may be moved in the video image in accordance with the identified movement of the second object in the video image by a user, etc. In another block, the first user-created object may be moved according to the motion vector of the first object.

Also, in the method 500 described, the first object may be a static object, and the first user-created object is manually movable by a user. Also, the movement of the second user-created object in association with the second object may be independent of the movement of the first user-created object.

Additionally, the method 500 may further comprise a block in which a difference of the first object and the second object is found using a technique such as frame comparison analysis, motion detection, object identification, edge detection analysis, or one of a variety of techniques for determining a difference between objects in a video image. Also, this difference finding may be included in one of blocks 561, 562 described above.

Further, the method 500 may include modifying the first user-created object depending on a user's input. Likewise, the method 500 may include modifying the second user-created object depending on a user's input. The modification may include deleting, moving, scaling, distorting, bending, compressing, stretching, shading, cropping, changing color, changing texture, or one of a variety of other modifications.

In some embodiments, a collision between two objects may be detected. For example, a collision between the first user-created object and the second user-created object may be detected. In addition or instead, a collision between the first user-created object and the first object may be detected. Or, a collision between the second user-created object and the second object may be detected. A collision between the first user-created object and the second object could be detected as well.

The collision may be defined in one of a variety of ways. One way might be to define a collision as occurring when the first user-created object and the second user-created object are at least contiguous, at least share one pixel, or come within a certain distance of each other.

In response to detecting a collision, certain effects may be generated. For example, the effect could be a sound generated in response to the detection of a collision. As another example, as an effect, a characteristic of the first user-created object and/or the second user-created object could change in response to a collision detection. The first user-created object and/or the second user-created object may be deformed in response to a collision detection.

In some embodiments, an overlap between the first user-created object and the second object may be detected. Alternatively, in other embodiments, an overlap between the first user-created object and the second user-created object may be detected. In addition or instead, an overlap between the first user-created object and the first object may be detected. Also in addition or instead, an overlap between the second user-created object and the second object may be detected.

The overlap may be defined in one of a variety of ways. One way might be to define an overlapping region as occurring where the first user-created object and the second object share the same portion or region of the video image. Or, the overlapping region may be where the first user-created object and the second object at least share several pixels. Or, the overlapping region may be where the first user-created object may be placed in front of at least a portion of the second object. In some embodiments, the overlapping region may occur where other objects overlap instead of the first user-created object and the second object.

Figure 21C:
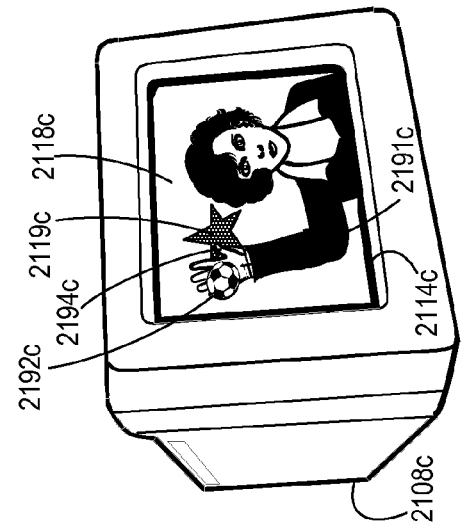
FIGS. 21a, 21b and 21c are diagrams illustrating certain aspects of the method for generating effects for a webcam application including detecting an overlapping region and modifying an object in response.
Figure 21B:
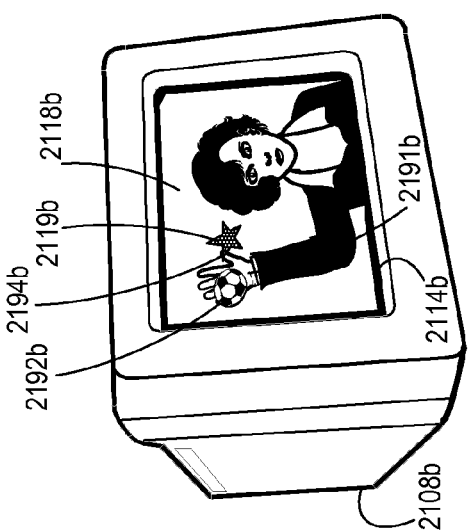
Figure 21A:
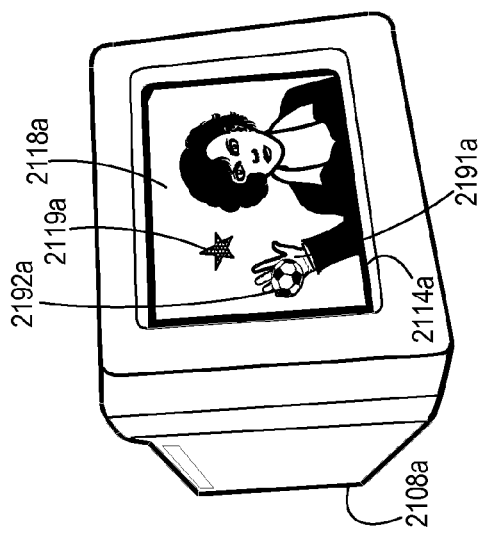

In response to detecting an overlap between the first user-created object and the second object, the first user-created object may be modified. This modification may be deformation, deletion, movement, scaling, distortion, bending, compression, stretching, shading, cropping, color change, texture change, or one of a variety of other modifications. FIGS. 21*a*, 21*b* and 21*c* illustrate one example of modification in response to detecting an overlap between a first user-created object 2119 and a second object 2191. In FIG. 21*a*, a first object 2118*a*, which may be a background region, has been identified. A first user-created object 2119*a*, which may be a star image, may have been added to the video image 2114*a* and associated with the first object 2118*a*. Additionally, a second object 2191*a*, which may be a hand image, may have been identified and a second user-created object 2192*a*, which may be a soccer ball image, may have been associated with the second object 2191*a*. In FIG. 21*b*, the second object 2191*b* may have moved in the video image 2114*b* such that the hand image overlaps 2194*b* a portion of the first user-created object 2119*b*. FIG. 21*c* illustrates a modification of the first user-created object 2119*c* that may occur in response to the second object 2191*b* overlapping the first user-created object 2119*c*. The modification depicted may be an increase in the scale of the first user-created object 2119*c*. In other words, the size of the star image may have increased in response to the overlapping of the second object 2191*c* and the first user-created object 2119*c*. In other embodiments, the modification may have been deformation, deletion, movement, distortion, bending, compression, stretching, shading, cropping, color change, texture change, or one of a variety of other modifications. Also, a different combination of objects may have formed the overlapped region, and one or more of those objects may be modified in response to a detection of the overlap.

In some embodiments, the method may also include tracking the second object. The tracking feature may include a determination of whether the second object was in the video image. Or, the tracking might determine where the second object is within the video image. In addition, the second user-created object may be removed responsive to a disappearance of the tracked second object from the video image. Also, the second user-created object may be reinstated responsive to a reappearance of the tracked second object in the video image. The reinstatement may include placing the removed second user-created object in the same association with respect to the second object as before the removal of the second user-created object. In some embodiments, this may mean putting the second user-created object back in the same location as the second object.

FIGS. 20a, 20b, and 20c illustrate one nonlimiting example of the embodiment of the tracking, removal and reinstatement features described above. FIG. 20a shows a monitor 2008a displaying a video image 2014a. The video image 2014a includes a first object 2018a, which is a background region, and a first user-created object 2019a, which is a star image, associated with the background region 2018a. Also included in the image is a second object, 2091a, which is a hand image, and a second user-created object 2092a, which is a soccer ball image. As shown in FIG. 20a, the second object 2091a may be tracked. In other words, whether the second object 2091a is in the video image 2014a may be determined. In some embodiments, whether at least portion of the second object 2091a is in the video image 2014a and/or the amount of the portion of the second object 2091a that is present in the video image 2014a may be determined as part of the tracking feature.

FIG. 20b illustrates the second object having moved out of the video image 2014b. Thus, the second object 2091a, which is the hand image, displayed in the video image 2014a in FIG. 20a is not displayed in the video image 2014b in FIG. 20b. As shown in FIG. 20b, the second object has disappeared from the video image 2014b and then, the second user-created object 2092a, which was displayed in video image 2014a in FIG. 20a, may be removed from the video image 2014b in FIG. 20b. Also, as shown in FIG. 20c, If the second object 2091c reappears in the video image 2014c, then the second user-created object 2092c may be reinstated in the video image 2092c. In this embodiment, the first object 2018 and the first user-created object 2019 may be independent of the second object 2091 and the second user-created object 2092.

In some of these embodiments, if only a portion of the second object disappears, then only corresponding portion of the second user-created object will be removed. Similarly, in some of these embodiments, if only a portion of the second object reappears, then only a corresponding portion of the second user-created object will reappear.

FIGS. 6a,b,c,d illustrates a nonlimiting example of the embodiment described in FIG. 5. As an example, FIG. 6a may show a monitor 608a displaying a video image 614a including a user image 616a. According to block 561 of FIG. 5, a first object 618a may be identified in a video image 614a, and in this illustration, the first object 618a may be a background region. According to block 562 of the method illustrated in FIG. 5, a second object 691a may be identified in the video image 614a. In this example, the second object 691a identified may be a hand image that is part of the user image 616a. The hand image may be detected by motion detection or one of a variety of other object detection techniques.

FIG. 6b illustrates the block 563 in which a first user-created object 619b may be added to the video image 614a to create an altered video image 614b. In this example, the first user-created object 619b may be a star image. In accordance with the adding block 564 of FIG. 5, FIG. 6b illustrates a soccer ball as a second user-created object 692b added to the video image 614a. A further altered video image 614b results from the addition and is shown as a user image 616b with a background region plus a soccer ball and a star. Then, according to block 565 of FIG. 5, the second user-created object 692b, the soccer ball, may then be associated with the second object 691b, the hand image.

Per the identifying movement block 566 of FIG. 5 and as shown in FIG. 6c, the movement 664c of the second object 691c in the video image 614c may be identified. In this nonlimiting example, the first object 618c, which may be the background region, remains static, and the first user created object 619c may remain static as well. Then, as indicated in block 567 of FIG. 5 and as shown in FIG. 6d, the second user-created object 692d may be moved 665d in accordance with the association of the second user-created object 692d and the second object 691d. In this example, the second user-created object 692d, the soccer ball, may be moved 665d in the same direction as the movement 664d of the second object 691d, the hand. However, the direction, speed, etc. of the movement of the second user-created object need not be identical to that of the second object. Please note that, when the user or user's hand moves in the video image, the star added to the static background region may remain at the same location and may be independent from the movement of the second object (hand or user) or the second user-created object (soccer ball). Also, the star may be manually movable by the user and repositioned in a different location on the background region.

Figure 7:
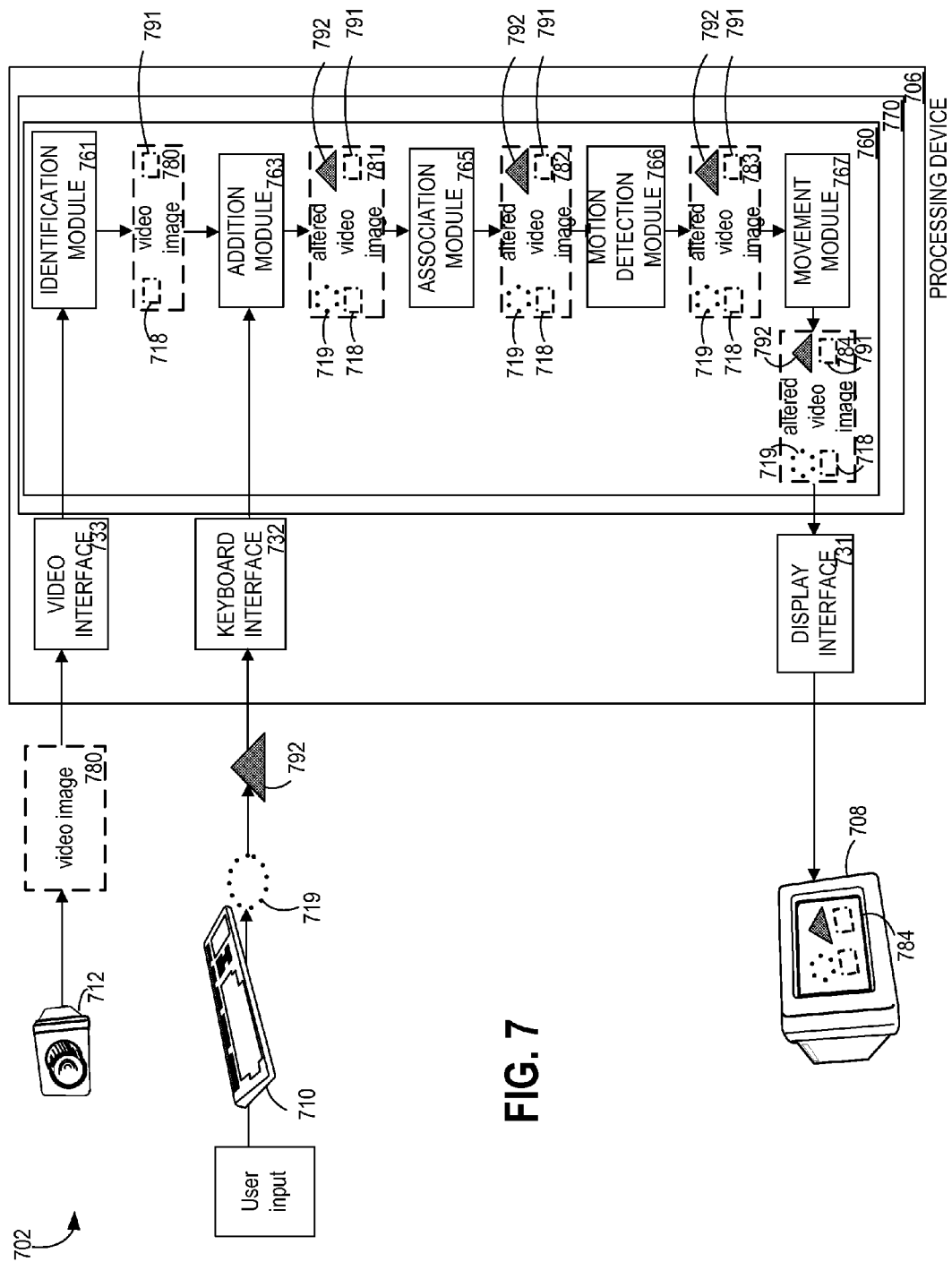
FIG. 7 is a schematic illustration of the logic and hardware connections for an embodiment of the system of generating effects for a webcam application having a display as an output.

FIG. 7 illustrates a logic and hardware diagram of one embodiment of the system for generating effects for a webcam application. This diagram shows the webcam application 760 being executed by the processor 770 in the processing device 706 and shows certain inputs to and outputs from the processor 770. Although this figure does not illustrate the computer system 702 in communication with any other computer system, such a configuration may be possible.

In this illustration of the system, a webcam 712 may send a video image 780 to the processing device 706, and the video image 780 may be received by the video interface 733. The video interface 733 may then send the video image 780 to an identification module 761 corresponding to the webcam application 760 on the processor 770. This identification module 761 may contain logic for identifying a first object 791 and a second object 718 in a video image 780. Once the first object 791 and second object 718 are identified, the video image 780 containing the first object 791 and second object 718 may be sent to an addition module 763. The addition module 763 may add a first user-created object 792 to the video image 780 and a second user-created object 719 to the video image 780 containing the identified first object 791 and second object 718 to create an altered video image 781. A user may input information regarding the first user-created object 792 into a keyboard 710, which may be connected to the processing device 706. Likewise, a user may input information regarding the second user-created object 719 into a keyboard 710, which may be connected to the processing device 706. The signal from the keyboard 710 may be fed into the keyboard interface 732 of the processing device 706. Also, though not pictured, a mouse may be connected to the processing device 706 and may receive user input regarding the second user-created object 719. The signal from the mouse may be fed into a mouse interface (not pictured) of the processing device 706. Thus, the user-created objects 792, 719 may be sent to the keyboard interface 732 via the connection, and the keyboard interface 732 may send the user-created objects 792, 719 to the addition module 763. The addition module 763 may include logic for adding the first user-created object 792 to the video image 780 to create an altered video image 781. Also, the addition module 763 may include logic for adding the second user-created object 719 to the altered video image 781, which may further alter the altered video image 781. The altered video image 781 may then be sent to an association module 765. The association module 765 may include logic for associating the second user-created object 719 with the second object 718. After the second user-created object 719 may be associated with the second object 718, the altered video image 782 may be sent to a motion detection module 766. The motion detection module 766 may contain logic for identifying a movement of the second object 718 in the altered video image 782. This motion detection may be accomplished using one of a variety of motion detection techniques as described above. Then, the altered video image 783 may be sent to a movement module 767. The movement module 767 may contain logic for moving the second user-created object 719 in accordance with the association of the second user-created object 719 with the second object 718. Thus, the second user-created object 719 may be moved in the altered video image 784, and this altered video image 784 may be sent to a display interface 731. The display interface 731 may then send this altered video image 784 to the monitor 708, which may display the altered video image 784.

In some embodiments, if no motion of the first object 791 was detected in the motion detection module 766, the altered video image 784 may be sent to the movement module 767, which may not change the movement of the second user-created object 719. The altered video image 784 showing no movement of the second object 718 or the second user-created object 719 may be sent to the display interface 731, which may send that altered video image 784 to the monitor 708. The monitor 708 may then display the altered video image 784 showing no movement of the second object 718 or the second user-created object 719.

Figure 8:
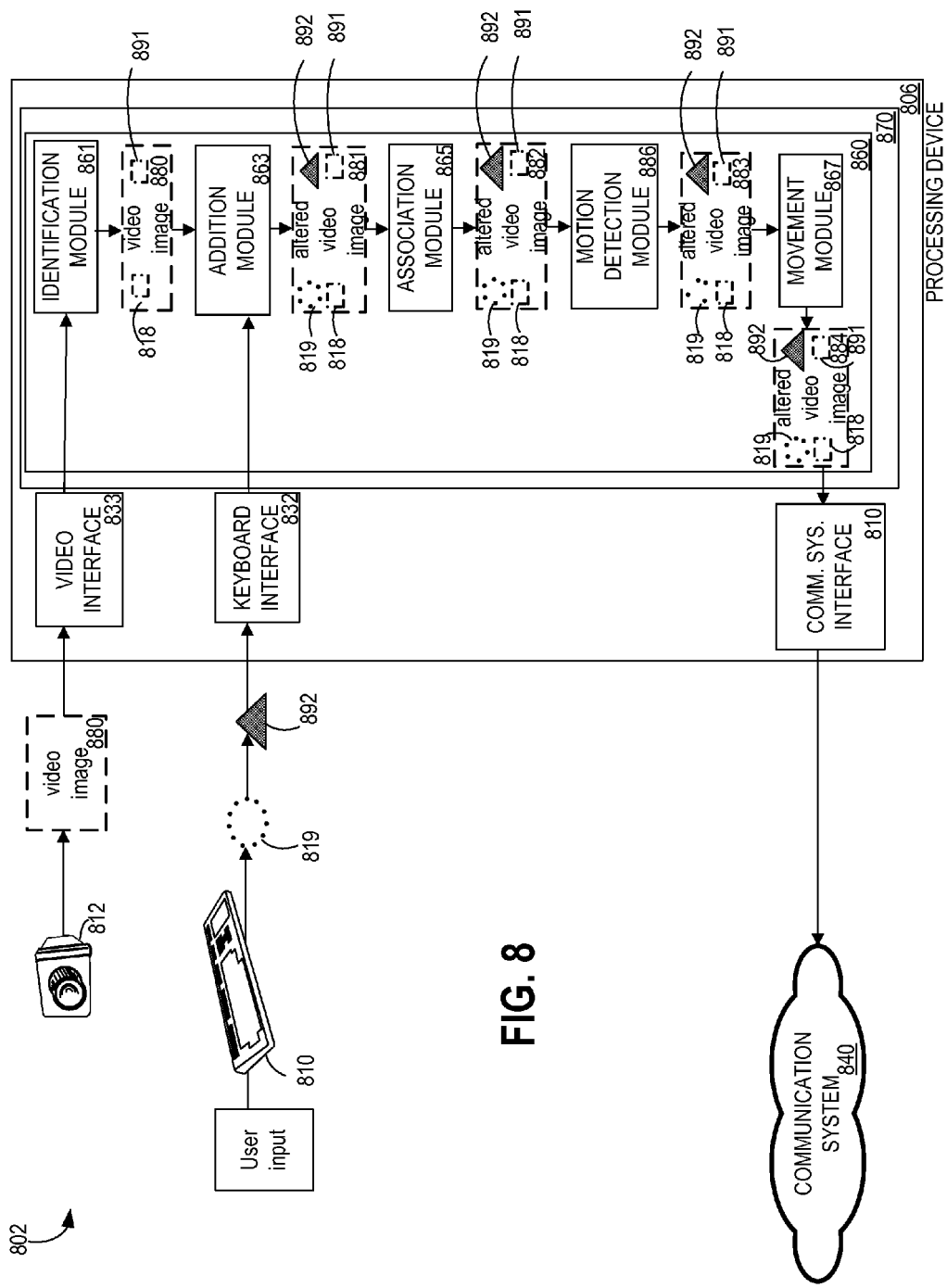
FIG. 8 is a schematic illustration of the logic and hardware connections for an embodiment of the system of generating effects for a webcam application having a communication as an output.

FIG. 8 also illustrates a logic and hardware diagram of one embodiment of a system for generating effects for a webcam application. This diagram shows the webcam application 860 being executed by the processor 870 in the processing device 806 and shows certain inputs to and outputs from the processor 870. This figure illustrates the computer system 802 communicating via the communication system 840.

FIG. 8 is similar to FIG. 7 except that the output may be sent to a communication system 840 instead of a monitor 708. Specifically, the altered video image 884 may be sent to the communication system interface 810, which sends the altered video image 884 to the communication system 840. Although, a monitor is not illustrated, one may be attached as well as a peripheral device. The altered video image 884 sent to the communication system interface 810, and the communication system 840 could also be sent to a connected monitor as well.

Figure 9B:
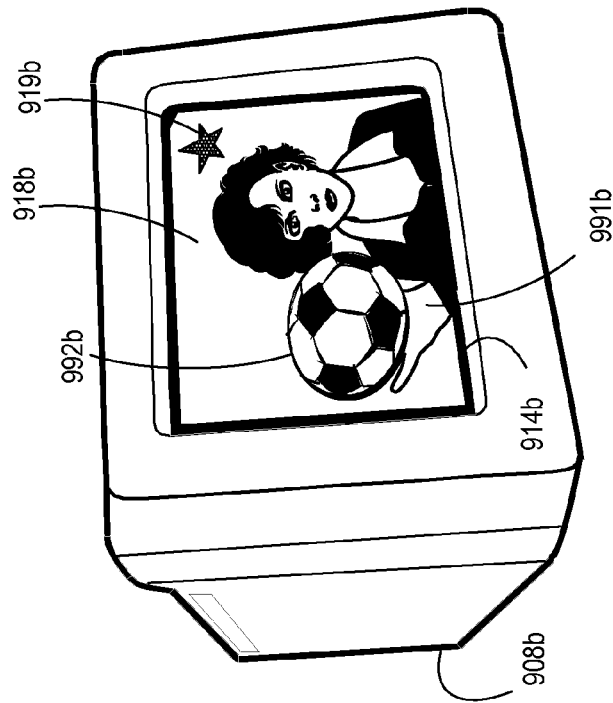
FIGS. 9a and b are diagrams illustrating certain effects generated by the method or system.
Figure 9A:
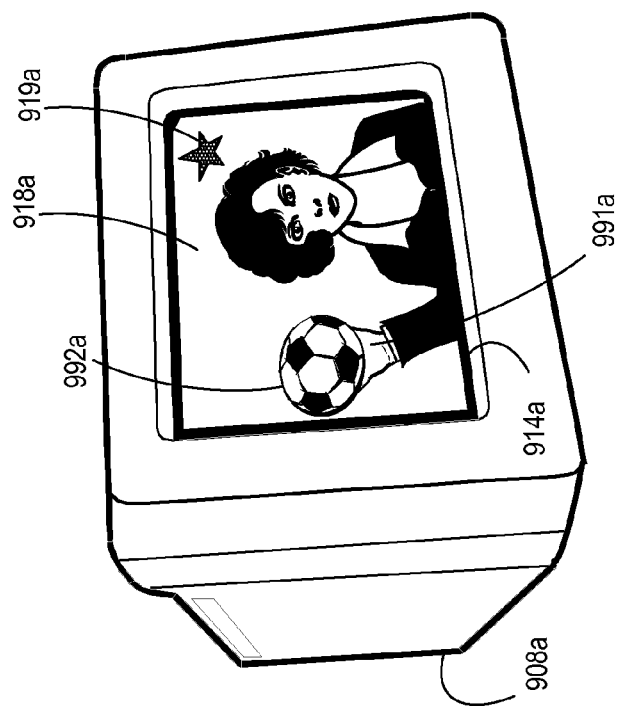

In addition to the method 500 described in FIG. 5, another block could include changing certain characteristics of the second user-created object according to changes in the associated second object. For example, if the scale of the second object changes, the scale of the second user-created object may be changed. This possible additional feature of the method 500 may be illustrated in FIGS. 9a and 9b. A monitor 908a of a computer system displays the altered video image 914a including a first object 918a, which may be the background region; a second object 991a, which may be a hand image; a first user-created object 919a, which may be a star image, and a second user-created object 992a, which may be a soccer ball image. When the user moves her hand toward the webcam, the scale of the hand image may be increased in the video image 914b. In other words, the size of the second object 991b may appear larger in the video image 914b. Because this characteristic, the scale of the second object 991b, changed, the same characteristic of the second user-created object 992b, the soccer ball image, may be changed as well. In FIG. 9b, the size of the hand image may be increased, and the size of the soccer ball image correspondingly may be increased. This change may give the appearance that, like the hand that has moved closer to the webcam, the soccer ball associated with the hand may have also moved closer to the webcam. Please note that, the scale of the star on the background may be independent from the scaling of the second user-created object 992b, the soccer ball image.

Though not illustrated, a similar example of changing a characteristic of the second user-created object according to a change in the second object may be changing the shading of a second user-created object according to the shading of the second object. There may be a shading factor that corresponds to the second object and a shading factor that corresponds to the second user-created object. Whenever the shading factor of the second object changes, the shading factor of the second user-created object may also be changed. This shading change of the second user-created object may be independent of any shading or shading changes of the first object and first user-created object.

In still another example not illustrated, if the second user-created object is text, the text may change depending on a characteristic of the second object. An example of this might be text associated with a hand image, and as the hand moves to a different location in the video image, the word in the text could correspondingly change. For instance, the hand image could be located at a top portion of the video image, and the hand image could be associated with text that says "HIGH." If the hand region moves down to a bottom portion of the video image, the text could be changed to say "LOW." Again, this change in the second user-created object may be independent of the first user-created object and the first object.

Figure 10:
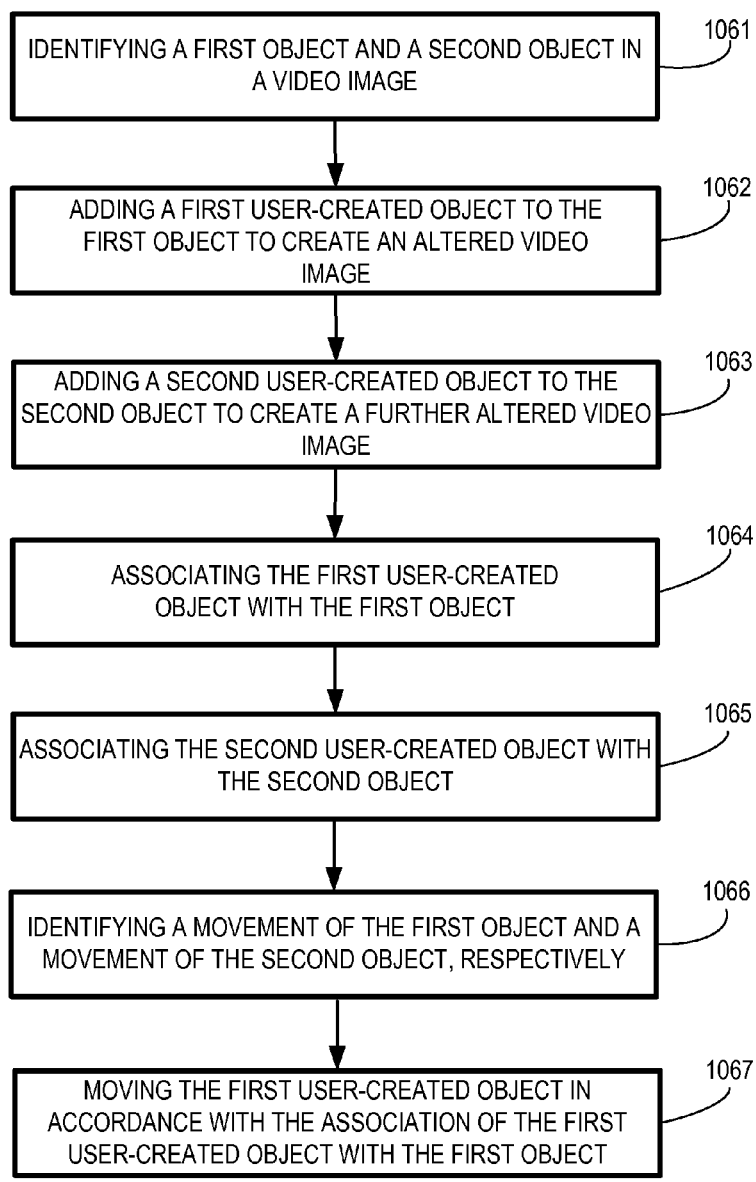
FIG. 10 is a flow chart illustrating another embodiment of the method for generating effects in a webcam application.

The flow chart of FIG. 10 shows the architecture, functionality, and operation of a possible implementation of one embodiment of the method 1000 as software for generating effects for a webcam application. In this regard, each block represents a module, segment, or portion of code, which comprises one or more executable instructions for implementing the specified logical function(s). It should also be noted that in some alternative implementations, the functions noted in the blocks may occur out of the order illustrated in FIG. 10. For example, two blocks shown in succession in FIG. 10 may in fact be executed substantially concurrently or the blocks may sometimes be executed in the reverse order, depending upon the functionality involved. Method 1000 may also be adapted to generate effects for another application using a different type of camera and is not limited to a webcam.

The method 1000 may include block 1061. In block 1061, a first object and a second object may be identified in a video image. The objects could be identified using various techniques such as facial detection (if the object is a face), motion detection (if the object moves) or another object identification technique. For example, in one technique, the difference between a frame and a next frame may be found. If the difference is less than a threshold, the video may be assumed to be static. Otherwise, the video may be assumed to be dynamic. In some embodiments, the first object may be a background region, and this background region may be static. The video image may be analyzed and divided into a background region and a dynamic region. The background region can be a static region which includes the same or similar frames over a predetermined period of time. Or, the background region may be captured first as a reference image, and then this reference image may be compared to the video image that includes the reference image to determine a foreground region. Also, the background region may be identified by one of a variety of other identification techniques instead.

Some other examples of various techniques for object detection or background detection are described in the following patents which are hereby incorporated herein by reference in their entirety: U.S. Pat. No. 5,748,775 issued to Tsuchikawa et al. and entitled "Method and Apparatus for Moving Object Extraction Based on Background Subtraction"; U.S. Pat. No. 4,075,604 issued to Mario Marco Degasperi and entitled "Method and Apparatus for Real Time Image Recognition"; U.S. Pat. No. 6,711,279 B1 issued to Hamza et al. and entitled "Object Detection"; U.S. Pat. No. 6,088,468 issued to Ito et al. and entitled "Method and Apparatus for Sensing Object Located Within Visual Field of Imaging Device"; and U.S. Pat. No. 5,721,692 issued to Nagaya et al. and entitled "Moving Object Detection Apparatus."

Block 1061 may also include identifying a third object, fourth object, etc. in the video image in addition to identifying the first object and the second object in the video image. In block 1062, a first user-created object may be added to the first object in the video image to create an altered video image. The first user-created object might be created by the user or selected by a program, a user, a correspondent, etc. from a preexisting bank of objects in a database. The first user-created object might also be generated by a program or automatically by the webcam application. Also, the first user-created object may be selected from the preexisting bank of objects and then modified by a user, program, correspondent, etc. before the addition. Further, the first user-created object may be text.

Further, the first user-created object could also have various characteristics. One such characteristic could be a degree of deformability. In other words, as an effect, the first user-created object may be susceptible to a high level of change in its shape or a low level of change in its shape depending upon a degree of deformability. Alternatively, the deformability may be of a compression-type or a bending-type. Another characteristic of the first user-created object may be temporal morphing as an effect. In other words, the first user-created object may change over time. For example, the first user-created object might be an image of a cut flower, and if displayed for a certain amount of time, the cut flower might wilt. Another characteristic of the first user-created object may be responsiveness to a stimulus as an effect. A characteristic may depend on whether the first user-created object is located in the foreground or the background. For example, a first user-created object located on the background may remain static, while a first user-created object in the foreground may be moved.

In addition to block 1062, block 1063 may be performed. In block 1063, a second user-created object may be added to the second object to further alter the altered video image. Like the first user-created object, the second user-created object may have some of the characteristics described above. Also, the second user-created object might be created by the user or selected by a program, a user, a correspondent, etc. from a preexisting bank of objects in a database. The second user-created object might also be generated by a program or automatically by the webcam application. Also, the second user-created object may be selected from the preexisting bank of objects and then modified by a user, program, correspondent, etc. before the addition. Further, the second user-created object might be text.

Another block in the method 1000 is block 1064. In block 1064, the first user-created object may be associated with the first object identified in block 1061. In some implementations of the method, the association might occur automatically, could occur according to the specification of a user, or by a hybrid of the two. In block 1065, the second user-created object may be associated with the second object. Additionally, if third object, fourth object, and etc. were identified, the first user-created object or second user-created object may be associated with those objects.

In block 1066, a movement of the first object in the video image may be identified (i.e. detected). A movement of a second object in the video image may also be detected. The movement of the first object and the second object may be independent. Numerous motion detection techniques exist for detecting movement in a video image as discussed above. Those motion detection techniques are also applicable in this embodiment.

Another block included in the method 1000 is block 1067. This block may include moving the first user-created object in accordance with the association of the first user-created object with the first object. As discussed above, the movement of the first object in the video image might be determined through motion detection techniques, and once the movement is identified, as an effect, the first user-created object may be moved in the video image in accordance with the identified movement of the first object in the video image, etc. Also, the second user-created object may be moved as an effect in accordance with the association of whichever identified object with which it became associated. The movement of the second user-created object may be independent of the movement of the first user-created object. The first user-created object and second user-created objects may also be manually movable by a user.

Figure 11B:
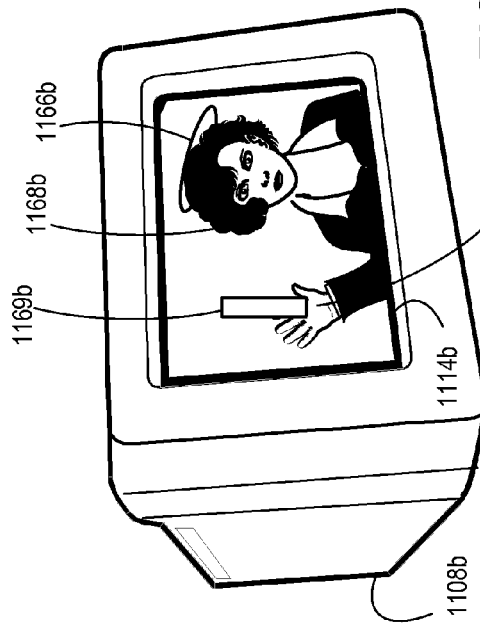
FIGS. 11a, 11b, 11c, and 11d are diagrams illustrating certain aspects of the method illustrated in FIG. 10.
Figure 11D:
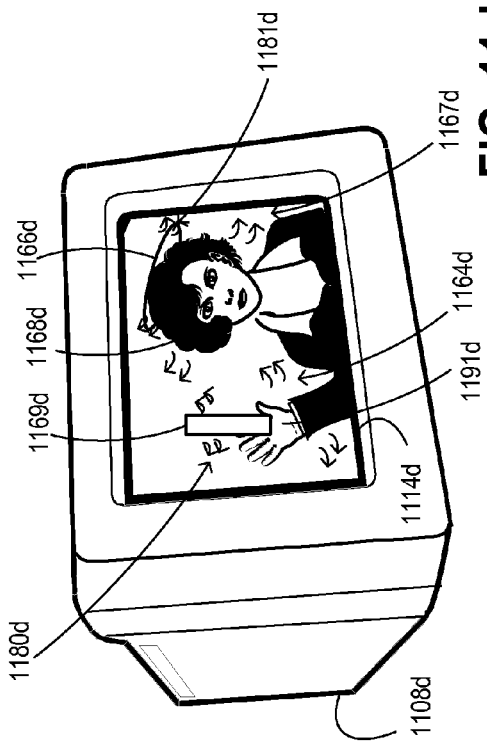
Figure 11A:
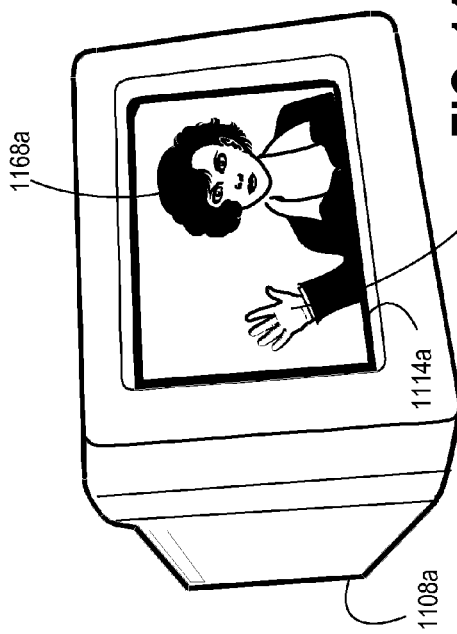

FIGS. 11a,b,c,d illustrate certain aspects of the embodiment shown in FIG. 10. FIG. 11 shows a monitor 1108a displaying a video image 1114a. According to the identifying block, a first object 1191a, which is a hand image, may be identified. A second object 1168a, which may be a head image, may be identified. After the hand image and the head image are identified, a first user-created object 1169b, which is a rectangle in this illustration, may be added to the video image 1114b as illustrated in FIG. 11b. The first user-created object 1169b may also be associated with the first object 1191b, a hand image. A second user-created object 1166b, in this case a halo, may also be added to the video image 1114b. This illustration shows the halo associated with the head image, which may be the second object 1168b identified.

Figure 11C:
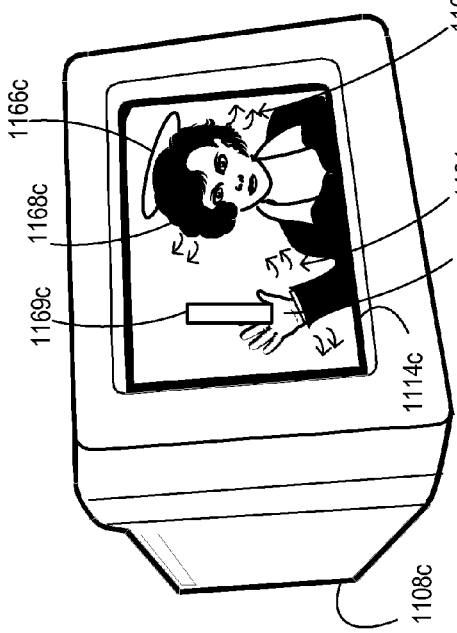

Then, FIG. 11c illustrates the identification of movement of the first object 1191c. The movement 1164c of the hand image may be identified. The movement of the second object 1168c, the head image, may also be identified. This feature may be illustrated in FIG. 11c as a movement 1167c of a head image being identified.

In FIG. 11d, as an effect, the first user-created object 1169d, the rectangle, may be moved 1180d in accordance with the association of the first user-created object 1169d and the first object 1191d, the hand image. Additionally, the second user-created object 1166d, the halo, may be moved 1181d in accordance with an association of the second object 1168d, the head image, having a movement 1167d, with the second user-created object 1166d.

The flow chart of FIG. 12 shows the architecture, functionality, and operation of a possible implementation of another embodiment of the method as software for generating effects for a webcam application. In this regard, each block represents a module, segment, or portion of code, which comprises one or more executable instructions for implementing the specified logical function(s). It should also be noted that in some alternative implementations, the functions noted in the blocks may occur out of the order noted in FIG. 12. For example, two blocks shown in succession in FIG. 12 may in fact be executed substantially concurrently or the blocks may sometimes be executed in the reverse order, depending upon the functionality involved. Method 1200 could also be adapted to generate effects for another application using a different type of camera and is not limited to a webcam.

The method 1200 shown in FIG. 12 may be similar to the method 1000 illustrated in FIG. 10. The method 1200 includes block 1261. In block 1261a first object may be identified in a video image. The object could be identified using various techniques such as facial detection (if the object is a face), motion detection (if the object moves) or another object identification technique. A second object, third object, fourth object, etc. may also be identified in the video image in addition to identifying the first object in the video image.

In block 1262, a user-created object may be added to the video image to create an altered video image. The user-created object might be created by the user or may be selected by a program, a user, a correspondent, etc. from a preexisting bank of objects in a database. The user-created object might also be generated by a program or automatically by the webcam application including a user-drawing module. Also, the user-created object could be selected from the preexisting bank of objects and then modified by a user, program, correspondent, etc. Further, the user-created object might be text.

The user-created object may also have various characteristics. One such characteristic could be a degree of deformability. In other words, the user-created object may be susceptible to a high level of change in its shape or a low level of change in its shape depending upon a degree of deformability. Alternatively, the deformability could be of a compression-type or a bending-type. Another characteristic of the user-created object might be temporal morphing. In other words, the user-created object may change over time. For example, the user-created object might be an image of a cut flower, and if displayed for a certain amount of time, the cut flower might wilt. Another characteristic of the user-created object could be responsiveness to a stimulus.

In addition to block 1262, the actions in block 1263 may be performed. In block 1263, a second user-created object may be added to the altered video image. Another block in the method 1200 is block 1264. In the associating block 1264, the user-created object may be associated with the first object identified in the identifying block 1261. In an implementation of the method 1200, the association might occur automatically or could occur according to the specification of a user, or by a hybrid of the two. Also, in block 1265, a second user-created object may be associated with the first object, the first user-created object, or a second object. If a third object, fourth object, etc. were identified, the first user-created object or second user-created object may be associated with those objects as well or instead.

In block 1266, a movement of the first object in the video image may be detected (i.e. identified). A movement of a second object may also be detected if a second object was identified. Numerous motion detection techniques exist for detecting movement in a video image as discussed above. Those motion detection techniques are also applicable in this embodiment. A first motion vector may be used to describe the motion of the first object, and a second motion vector may be used to describe the motion of the second object. In other words, the motion of each object can have a direction and a velocity. The direction and velocity of each can be represented as a vector that describes the motion of each.

Another block included in the method 1200 is block 1267. In this block, the first user-created object may be moved in accordance with the association of the first user-created object with the first object. As discussed above, the movement of the first object in the video image might be determined through motion detection techniques, and once the movement is identified, the user-created object may be moved in the video image in accordance with the identified movement of the first object in the video image. by a user, etc. Also, the second user-created object may be moved in accordance with the association of whichever identified object it may have been associated with. The movement of the second user-created object may be independent of the objects with which the second user-created object is not associated.

Yet another possible block in the method 1200 may be block 1268. In block 1268, a collision between two objects may be detected. For example, a collision between the first user-created object and the second user-created object may be detected. In addition or instead, a collision between the first user-created object and the first object may be detected. Or, a collision between the second user-created object and the second object may be detected. A collision between the first user-created object and the second object could be detected as well.

The collision may be defined in one of a variety of ways. One way might be to define a collision as occurring when the first user-created object and the second user-created object are at least contiguous, at least share one pixel, overlap or come within a certain distance of each other.

In response to detecting a collision, certain effects may be generated. For example, the effect could be a sound generated in response to the detection of a collision. As another example, as an effect, a characteristic of the first user-created object and/or the second user-created object could change in response to a collision detection. The first user-created object and/or the second user-created object may be deformed in response to a collision detection.

Figure 13B:
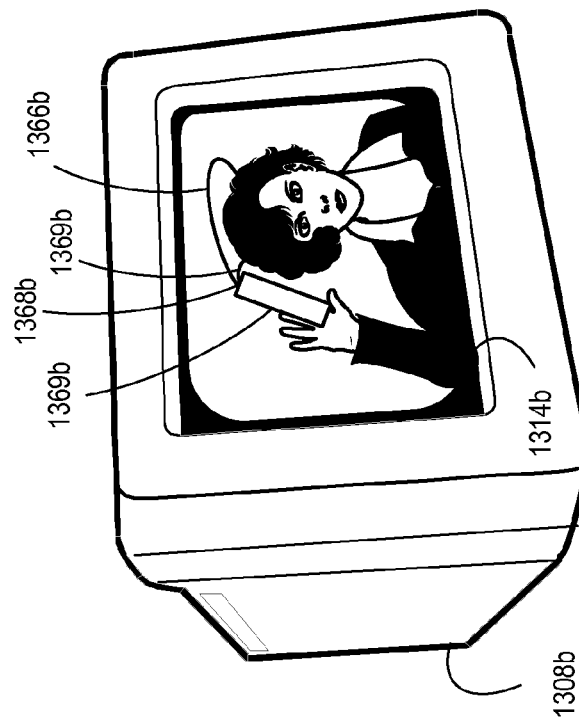
FIGS. 13a and b are diagrams illustrating deforming effects possible in addition to effects described in FIG. 12.
Figure 13A:
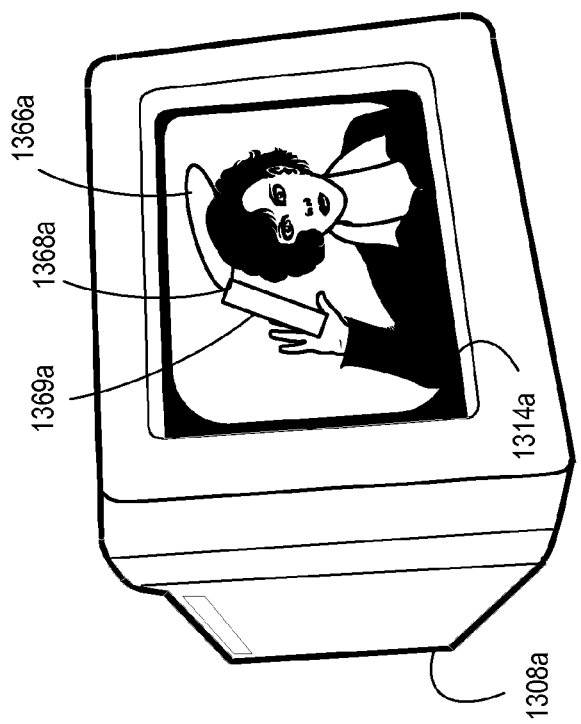

FIGS. 13a and 13b illustrate one nonlimiting example of this feature. FIG. 13a shows a collision 1368a between the second user-created object 1366a, the halo, and the first user-created object 1369a, the rectangle. Here, the rectangle and the halo may be shown in the video image 1314a as being at least contiguous. In response to the detected collision, the second user-created object 1366b, may be deformed 1369b as an effect generated due to the collision 1368b. Although not shown in the figure, when a collision between the first user-created object (the rectangle 1369a of FIG. 13) and the first object (the head of the first object 1314a) is detected, the first user-created object may be deformed in response to the collision detection.

FIGS. 14a and 14b illustrate another nonlimiting example of effects generation feature. In FIGS. 14a and 14b a typical computer system 1402a, 1402b for using a webcam application is shown. The computer system 1402a, 1402b may include a webcam 1412a, 1412b and a monitor 1408a, 1408b coupled to the processing device 1406a, 1406b. The computer system 1402a, 1402b may also include a keyboard 1410a, 1410b coupled to the processing device 1406a, 1406b.

Additionally, a mouse, although not pictured, may be coupled to the processing device 1406a, 1406b. The monitor 1408a, 1408b may display a video image 1414a, 1414b. Also, an audio system 1420a, 1420b may be coupled to the processing device 1406a, 1406b. The audio system 1420a, 1420b, may include a speaker 1421a, 1421b and a microphone 1422a, 1422b.

FIG. 14a illustrates a first object 1491a, a hand image, and a second object 1168a, a head image. A first user-created object 1469a, which is a rectangle, may have been added to the video image 1414a and may be associated with the first object 1491a. In this illustration the first user-created object 1469a may be moving. FIG. 14b illustrates a collision between the first user-created object 1469b and the first object 1491b. In response to detecting a collision between the first user-created object 1469b and the first object 1491b, an effect may be generated. That effect may be a playing of a sound 1423b. The sound could be a crash, explosion, or alarm-type sound, for example.

Alternatively, text could be displayed in response to detecting a collision. The text might contain an onomatopoeia that describes a sound such as "KA-BOOM" or "SPLAT". Also, both the text object and the sound could be displayed as dual effects. Additionally, instead of playing a sound or displaying text, a third user-created object could be displayed in response to detecting a collision. Also, in response to detecting a collision, one or more of the user-created objects could change color, become transparent or change position.

The effect generated could also depend on the relative motion vectors of the first object and the second object. For example, if the first object is associated with a first user-created object and the second object is associated with a second user-created object, the movement of the first object relative to the movement of the second object may affect the effect generated in response to detecting a collision between the first user-created object and the second user-created object. If the first object and second object are moving toward each other at a high velocity when the first user-created object and the second user-created object collide, the effect generated might be of a higher intensity. If the first object is moving and the second object is not, and a collision between the first user-created object and the second user-created object results, the effect generated might be of a lower intensity. The motion vectors of the first object and the second object may be compared to determine the appropriate intensity of the effect generated. The intensity of the effect generated may be the volume of the sound, the amount that the shapes of the user-created objects are deformed, the size of the text displayed or a third user-created object displayed, etc.

Another effect that could be generated may be showing a shaky image of the first user-created object or the second user-created object. The shaky image could represent vibrations that result due to the fictitious impact that results out of the collision. The shaky image would be a quick series of slightly moved images of the user-created object to give the appearance of shaking or vibrations. Or the objects themselves could be displayed as shaking by showing the objects as slightly moved back and forth in a series of frames. Alternatively, the entire video image could be shown as a shaky image in response to detecting a collision.

The shaking of the display may have a degree or intensity as well. The intensity could be indicated by how far the images are moved from their original positions as they move back and forth. This intensity may depend upon the relative motion vectors of the first object and the second object. For example, if both the first object and the second objects are heading toward each other (in other words, in opposite directions) at a high velocity, the intensity of the shaking of the first object, the second object, or both may be high.

Figure 15:
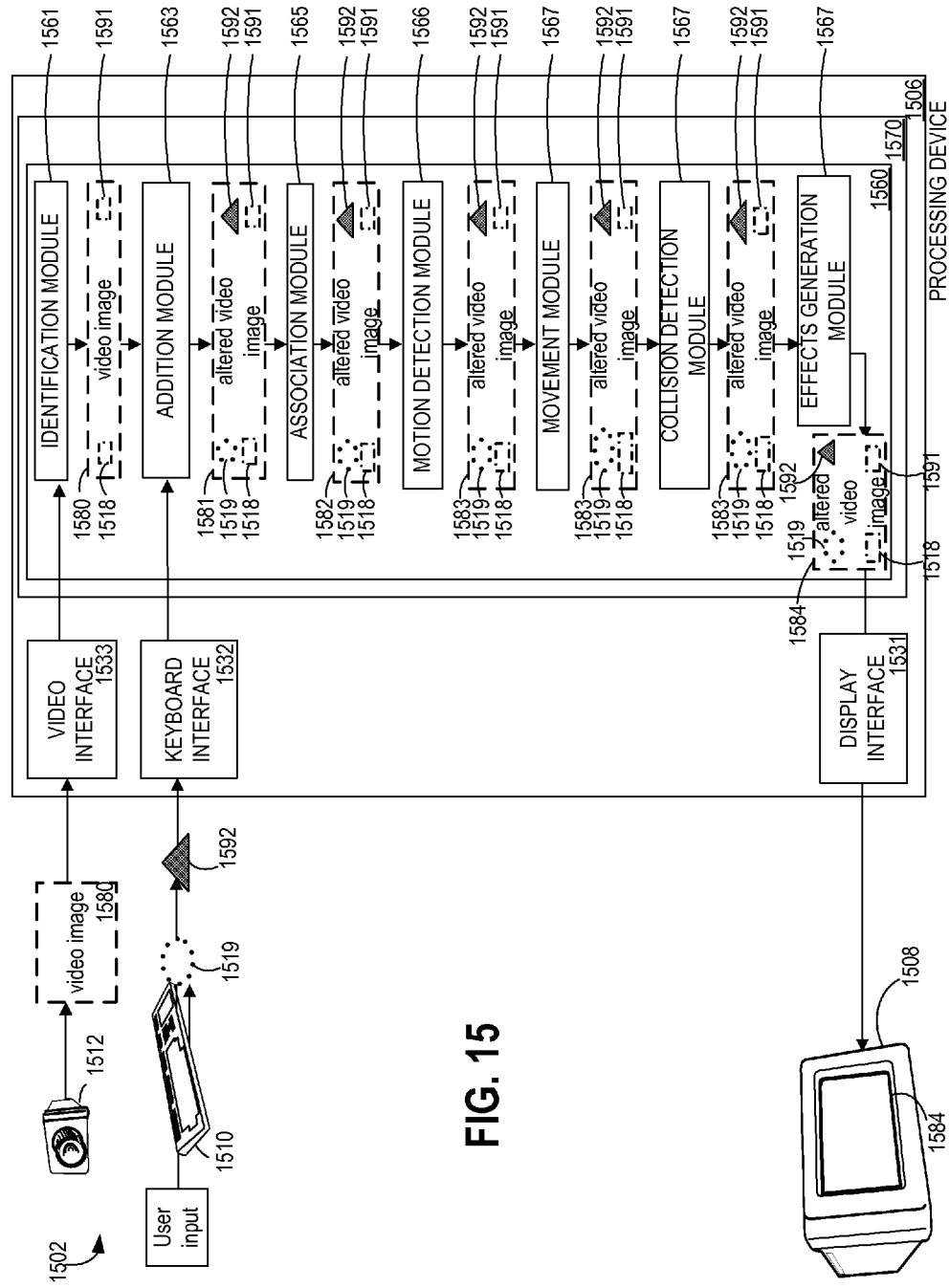
FIG. 15 is a schematic illustration of the logic and hardware connections for an embodiment of the system of generating effects for a webcam application having a display as an output.

FIG. 15 illustrates a logic and hardware diagram of one embodiment of the system for generating effects for a webcam application. This diagram shows the webcam application 1560 being executed by the processor 1570 in the processing device 1506 and shows certain inputs to and outputs from the processor 1570. The processor 1570 outputs the altered video image 184 to a display interface 1531, which then sends it to a monitor 1508. The monitor 1508 will display the altered video image 1584. Although not illustrated in this diagram, the computer system 1502 may also be in communication with another computer system.

In FIG. 15, a webcam 1512 sends a video image 1580 to the processing device 1506 and the video image 1580 is received by the video interface module 1561. The video interface 1533 then sends the video image 1580 to an identification module 1561. This identification module 1561 contains logic for identifying a first object 1591 and a second object 1518 in a video image 1580. Once the first object 1591 and the second object 1518 have been identified, the video image 1580 containing the identified objects may be sent to an addition module 1563. The addition module 1563 may add a first user-created object 1592 and a second user-created object 1519 to the video image 1580 to create an altered video image 1581. Then, the altered video image 1581 may be sent to an association module 1565. The association module 1565 may associate the first user-created object 1592 with the first object 1591, and the association module 1565 may also associate the second user-created object 1519 with the second object 1518 in video image 1582. Then video image 1582 may be sent to a motion detection module 1566. The motion detection module 1566 may detect a movement of the first object 1591 and/or the second object 1518. Then the video image 1583 may be sent to a collision detection module 1567. In the collision detection module 1567, a collision between the first object 1591 and the first user-created object 1592 may be detected. Alternatively, a collision between the first object 1591 and the second object 1518 may be detected. Or, a collision between the second object 1518 and the second user-created object 1519 may be detected. Instead, a collision between the first user-created object 1592 and the second user-created object 1519 may be detected. Or, a collision between the first user-created object 1592 and the second object 1518 may be detected. Also, a collision between the second user-created object 1519 and the first object 1591 may be detected in using the collision detection module 1567.

Figure 16:
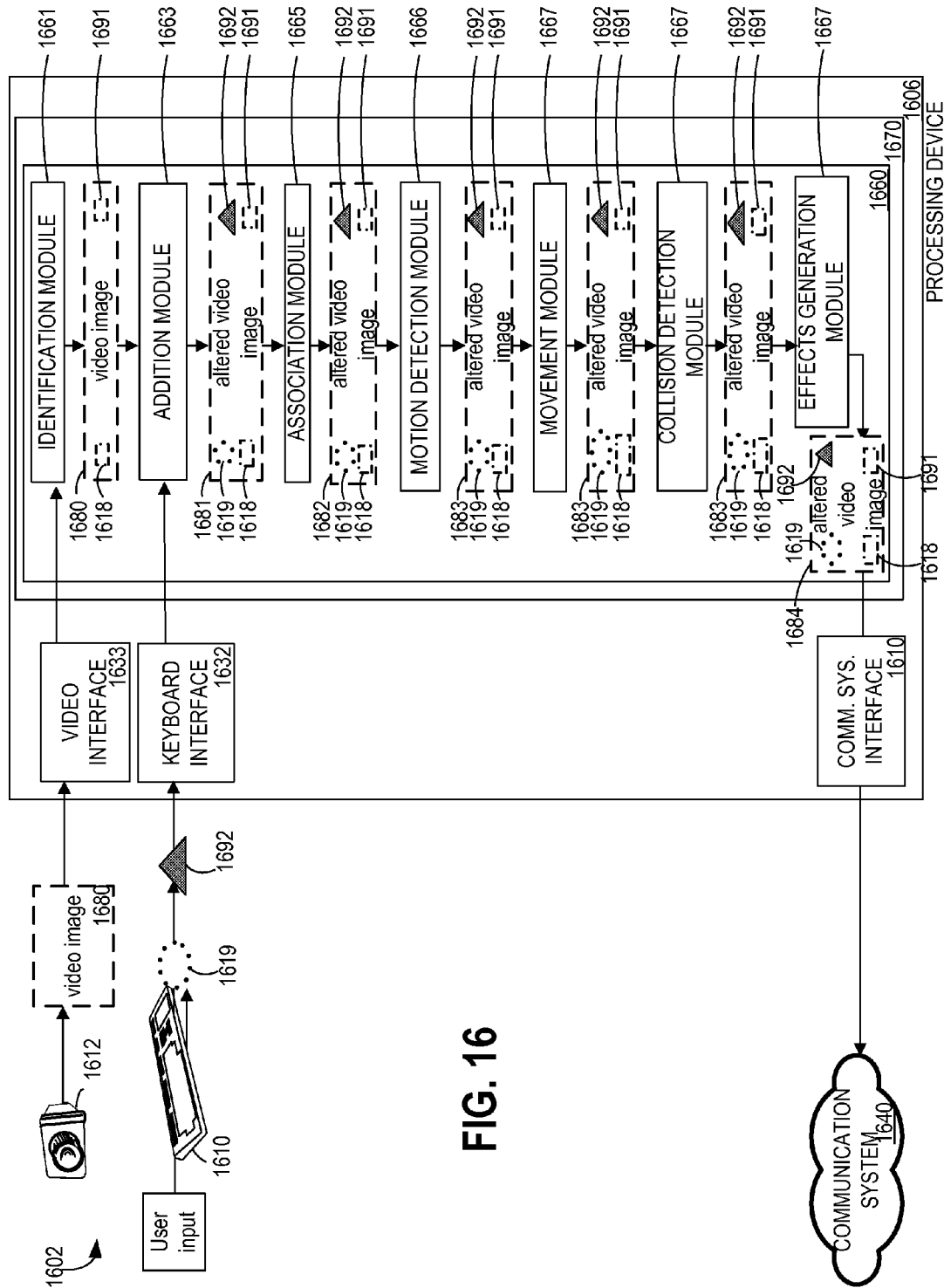
FIG. 16 is a schematic illustration of the logic and hardware connections for an embodiment of the system of generating effects for a webcam application having a communication as an output.

Then, the video image 1583 may be sent to an effects generation module 1567. The effects generation module 1567 may generate an effect in response to the detection of a collision by the collision detection module 1567. The effect generated may be one of the effects described above. Then the video image 1584 may be sent to a display interface 1531, which may send the video image 1584 to a monitor 1508 for displaying the video image 1584. Alternatively or in addition, as illustrated in FIG. 16, the video image 1684 may be sent to the communication system interface 1610, which may then send the video image 1684 to a communication system 1640.

Figure 17:
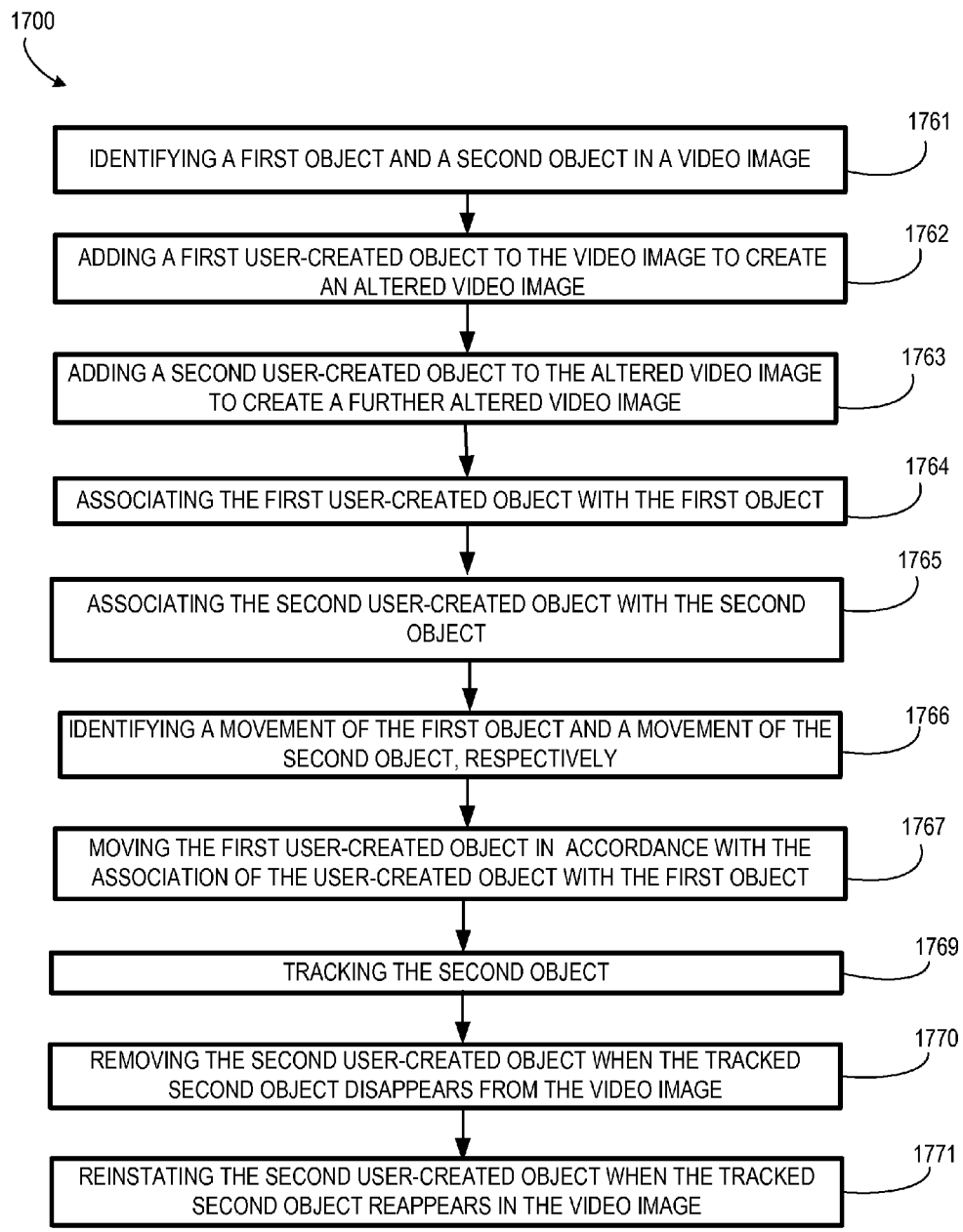
FIG. 17 is a flow chart illustrating yet another embodiment of the method for generating effects in a webcam application including tracking the second object.

The flow chart of FIG. 17 shows the architecture, functionality, and operation of a possible implementation of another embodiment of the method as software for generating effects for a webcam application. In this regard, each block represents a module, segment, or portion of code, which comprises one or more executable instructions for implementing the specified logical function(s). It should also be noted that in some alternative implementations, the functions noted in the blocks may occur out of the order noted in FIG. 17. For example, two blocks shown in succession in FIG. 17 may in fact be executed substantially concurrently or the blocks may sometimes be executed in the reverse order, depending upon the functionality involved. Method 1700 could also be adapted to generate effects for another application using a different type of camera and is not limited to a webcam.

The method 1700 shown in FIG. 17 may be similar to the method 1000 illustrated in FIG. 10. The method 1700 includes block 1761. In block 1761 a first object may be identified in a video image. The object could be identified using various techniques such as facial detection (if the object is a face), motion detection (if the object moves) or another object identification technique. A second object, third object, fourth object, etc. may also be identified in the video image in addition to identifying the first object in the video image.

In block 1762, a user-created object may be added to the video image to create an altered video image. The user-created object might be created by the user or may be selected by a program, a user, a correspondent, etc. from a preexisting bank of objects in a database. The user-created object might also be generated by a program or automatically by the webcam application including a user-drawing module. Also, the user-created object could be selected from the preexisting bank of objects and then modified by a user, program, correspondent, etc. Further, the user-created object might be text.

The user-created object may also have various characteristics. One such characteristic could be a degree of deformability. In other words, the user-created object may be susceptible to a high level of change in its shape or a low level of change in its shape depending upon a degree of deformability. Alternatively, the deformability could be of a compression-type or a bending-type. Another characteristic of the user-created object might be temporal morphing. In other words, the user-created object may change over time. For example, the user-created object might be an image of a cut flower, and if displayed for a certain amount of time, the cut flower might wilt. Another characteristic of the user-created object could be responsiveness to a stimulus.

In addition to block 1762, the actions in block 1763 may be performed. In block 1763, a second user-created object may be added to the altered video image. Another block in the method 1700 is block 1764. In the associating block 1764, the user-created object may be associated with the first object identified in the identifying block 1761. In an implementation of the method 1700, the association might occur automatically or could occur according to the specification of a user, or by a hybrid of the two. Also, in block 1765, a second user-created object may be associated with the first object, the first user-created object, or a second object. If a third object, fourth object, etc. were identified, the first user-created object or second user-created object may be associated with those objects as well or instead.

In block 1766, a movement of the first object in the video image may be detected (i.e. identified). A movement of a second object may also be detected if a second object was identified. Numerous motion detection techniques exist for detecting movement in a video image as discussed above. Those motion detection techniques are also applicable in this embodiment. A first motion vector may be used to describe the motion of the first object, and a second motion vector may be used to describe the motion of the second object. In other words, the motion of each object can have a direction and a velocity. The direction and velocity of each can be represented as a vector that describes the motion of each.

Another block included in the method 1700 is block 1767. In this block, the first user-created object may be moved in accordance with the association of the first user-created object with the first object. As discussed above, the movement of the first object in the video image might be determined through motion detection techniques, and once the movement is identified, the user-created object may be moved in the video image in accordance with the identified movement of the first object in the video image. by a user, etc. Also, the second user-created object may be moved in accordance with the association of whichever identified object it may have been associated with. The movement of the second user-created object may be independent of the objects with which the second user-created object is not associated.

Yet another possible block in the method 1700 may be block 1769. In block 1769, the second object may be tracked. The tracking feature may include a determination of whether the second object was in the video image. Or, the tracking might determine where the second object is within the video image. In addition, in block 1770, the second user-created object may be removed responsive to a disappearance of the tracked second object from the video image. Also, in block 1771, the second user-created object may be reinstated responsive to a reappearance of the tracked second object in the video image. In some of these embodiments, if only a portion of the second object disappears, then only corresponding portion of the second user-created object will be removed. Similarly, in some of these embodiments, if only a portion of the second object reappears, then only a corresponding portion of the second user-created object will reappear.

Figure 18:
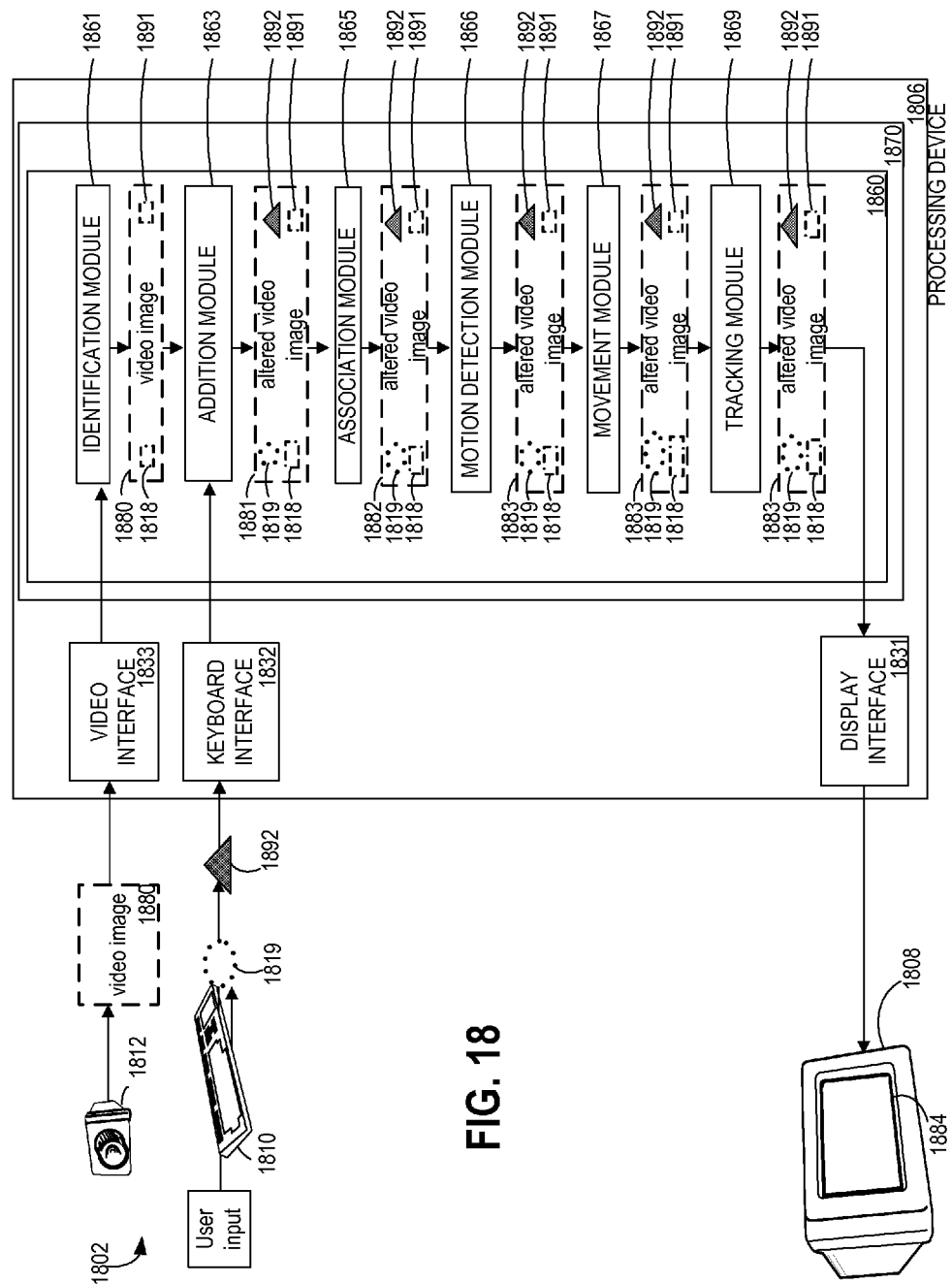
FIG. 18 is a schematic illustration of the logic and hardware connections for an embodiment of the system of generating effects for a webcam application including a tracking module and having a display as an output.

FIG. 18 illustrates a logic and hardware diagram of one embodiment of the system for generating effects for a webcam application. This diagram shows the webcam application 1860 being executed by the processor 1870 in the processing device 1806 and shows certain inputs to and outputs from the processor 1870. The processor 1870 outputs the altered video image 1884 to a display interface 1831, which then sends it to a monitor 1808. The monitor 1808 will display the altered video image 1884. Although not illustrated in this diagram, the computer system 1802 may also be in communication with another computer system.

In FIG. 18, a webcam 1812 sends a video image 1880 to the processing device 1806 and the video image 1880 is received by the video interface module 1861. The video interface 1833 then sends the video image 1880 to an identification module 1861. This identification module 1861 contains logic for identifying a first object 1891 and a second object 1818 in a video image 1880. Once the first object 1891 and the second object 1818 have been identified, the video image 1880 containing the identified objects may be sent to an addition module 1863. The addition module 1863 may add a first user-created object 1892 and a second user-created object 1819 to the video image 1880 to create an altered video image 1881. Then, the altered video image 1881 may be sent to an association module 1865. The association module 1865 may associate the first user-created object 1892 with the first object 1891, and the association module 1865 may also associate the second user-created object 1819 with the second object 1818 in video image 1882. Then video image 1882 may be sent to a motion detection module 1866. The motion detection module 1866 may detect a movement of the first object 1891 and/or the second object 1818. Then, the altered video image 1883 may be sent to a movement module 1867. The movement module 1867 may contain logic for moving the second user-created object 1819 in accordance with the association of the second user-created object 1819 with the second object 1818. Thus, the second user-created object 1819 may be moved in the altered video image 1884. Next, this altered video image 1884 may be sent to a tracking module 1869.

Figure 19:
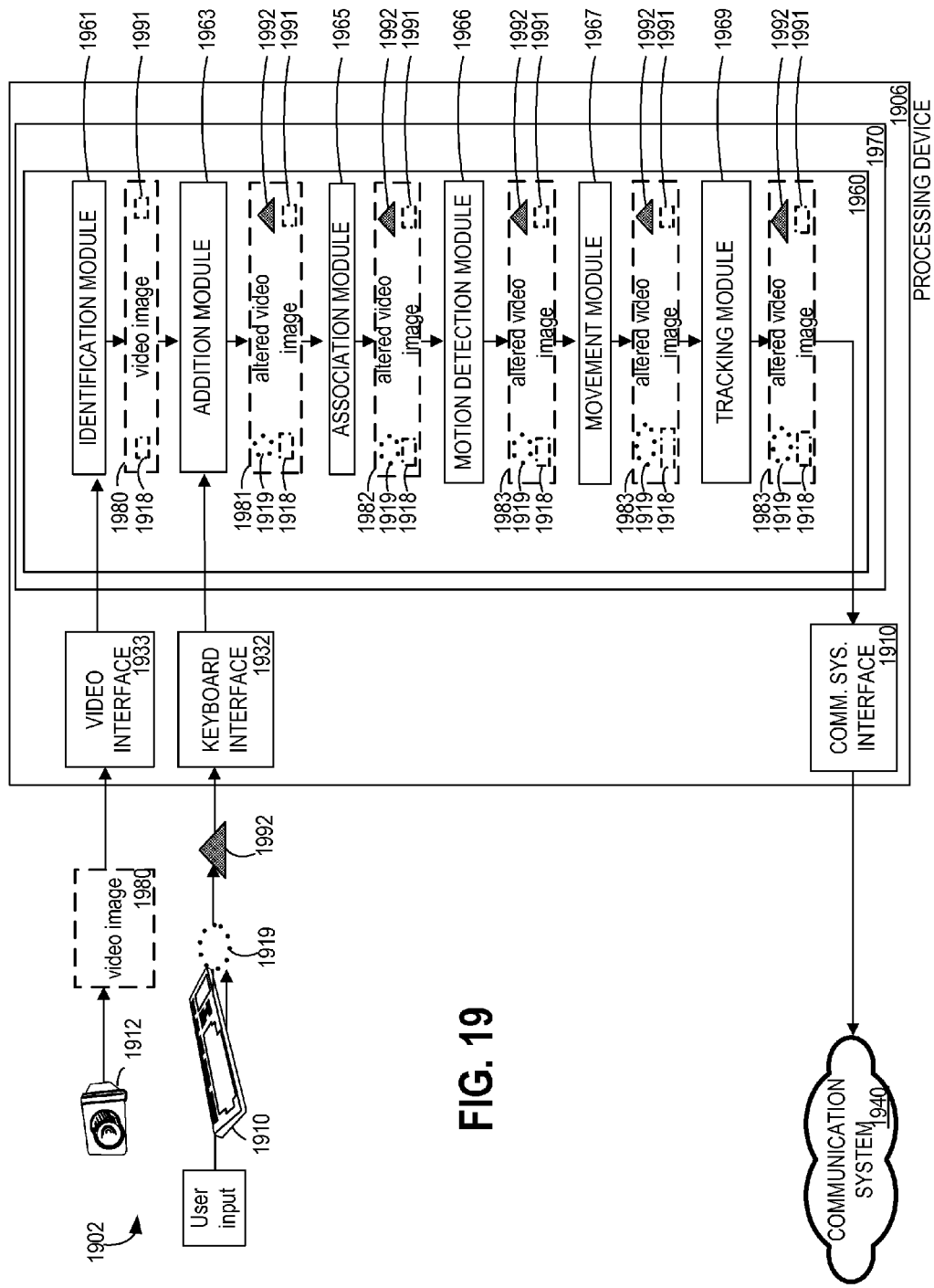
FIG. 19 is a schematic illustration of the logic and hardware connections for an embodiment of the system of generating effects for a webcam application including a tracking module and having a communication as an output.

In the tracking module 1869, the second object 1818 may be tracked. Also, the second user-created object 1819 may be removed in response to a disappearance of the tracked second object 1818 from the video image. Then, the second user-created object 1819 may be reinstated in response to the reappearance in the video image of the tracked second object 1818. Later, the video image 1884 may be sent to a display interface 1831, which may send the video image 1884 to a monitor 1808 for displaying the video image 1884. Alternatively or in addition, as illustrated in FIG. 19, the video image 1984 may be sent to the communication system interface 1910, which may then send the video image 1984 to a communication system 1940.

FIGS. 20*a*, 20*b*, and 20*c* may be discussed with respect to the embodiment described in FIG. 17. FIG. 20*a* shows a monitor 2008*a* displaying a video image 2014*a*. The video image 2014*a* includes a first object 2018*a*, which is a background region, and a first user-created object 2019*a*, which is a star image, associated with the background region 2018*a*. Also included in the image is a second object, 2091*a*, which is a hand image, and a second user-created object 2092*a*, which is a soccer ball image. According to block 1769, the second object 2091*a* may be tracked. In other words, whether the second object 2091*a* is in the video image 2014*a* may be determined. In some embodiments, whether at least portion of the second object 2091*a* is in the video image 2014*a* and/or the amount of the portion of the second object 2091*a* that is present in the video image 2014*a* may be determined as part of block 1769.

FIG. 20*b* illustrates the second object having moved out of the video image 2014*b*. Thus, the second object 2091*a*, which is the hand image, displayed in the video image 2014*a* in FIG. 20*a* is not displayed in the video image 2014*b* in FIG. 20*b*. In accordance with block 1770, the second object has disappeared from the video image 2014*b* and then, the second user-created object 2092*a*, which was displayed in video image 2014*a* in FIG. 20*a*, may be removed from the video image 2014*b* in FIG. 20*b*. Also, in accordance with block 1771, if the second object 2091*c* reappears in the video image 2014*c* as illustrated in FIG. 20*c*, then the second user-created object 2092*c* may be reinstated in the video image 2092*c*. In this embodiment, the first object 2018 and the first user-created object 2019 may be independent of the second object 2091 and the second user-created object 2092.

In some embodiments, both the first object may be tracked and the second object may be tracked. Also, the first user-created object may be removed if the first object disappears from the video image. In addition, the second user-created object may be removed if the second object disappears from the video image. In other words, if the user disappears from the video image, the head and hand images would no longer be in the video image. If any user-created objects were associated with the head image or the hand image, then those user-created objects would be removed because those images would no longer be in the video image. Additionally, the first user-created object may be reinstated and the second user-created object may be reinstated if the first object and the second object reappear in the video image. So, in the example described above, if the user reappears in the video image, then the user-created objects that are associated with the head image and the hand image would reappear as well and be located as before with respect to the objects with which they were associated.

The systems and methods provided herein can be implemented in hardware, software, firmware, or a combination thereof. In one embodiment, the method for generating effects in a webcam application is implemented in software or firmware that is stored in a memory and that is executed by a suitable instruction execution system. If implemented in hardware, as in an alternative embodiment, the system for generating effects in a webcam application can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or blocks in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the system and method provided herein.

The software program implementing the method for generating effects in a webcam application can comprise an ordered listing of executable instructions for implementing logical functions, which can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any of a variety of means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of the present invention includes embodying the functionality of the preferred embodiments of the present invention in logic embodied in hardware or software-configured mediums.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method of generating effects for a webcam application, comprising the steps of:
   identifying a first object in a video image;
   identifying a second object in the video image;
   adding a first user-created object to the video image to create an altered video image;
   adding a second user-created object to the altered video image to further alter the altered video image;
   associating the second user-created object with the second object; and
   identifying a movement of the second object;
   moving the second user-created object in the altered video image in accordance with the association of the second user-created object with the second object; and
   wherein the first object is a static object, wherein the first user-created object is manually movable, and wherein the movement of the second user-created object in association with the second object is independent of a movement of the first user-created object.

2. The method of claim 1, wherein the first object is a background region.

3. The method of claim 1, further comprising associating the first user-created object with the first object.

4. The method of claim 1, wherein the first user-created object and the second user-created object are selected from a group consisting of: a user-drawn object, a user-selected object, a copied object and text.

5. The method of claim 1, wherein the first user-created object and the second user-created object are deformable, respectively.

6. The method of claim 1, wherein the first user-created object and the second user-created object are responsive to a stimulus, respectively.

7. The method of claim 1, wherein the first user-created object and the second user-created object morph temporally, respectively.

8. The method of claim 1, further comprising scaling the second user-created object.

9. The method of claim 8, wherein the scaling of the second user-created object is dependent upon the scale of the second object.

10. The method of claim 1, further comprising shading the second user-created object.

11. The method of claim 10, wherein the shading of the second user-created object is dependent upon the shade of the second object.

12. The method of claim 1, wherein the identifying movement step further comprises defining a second object motion vector based on the movement of the second object.

13. The method of claim 12, further comprising: modifying the second user-created object depending on the second object motion vector.

14. The method of claim 1, wherein the identifying the movement step further comprises finding difference of the first object and the second object using a technique selected from a group consisting of frame comparison analysis, motion detection, object identification technique, or edge detection analysis.

15. The method of claim 1, further comprising: modifying the first user-created object depending on a user input.

16. The method of claim 1, further comprising: modifying the second user-created object depending on a user input.

17. The method of claim 1, further comprising:
   detecting a collision between the first user-created object and the second user-created object, wherein a collision occurs when the first user-created object and the second user-created object are at least contiguous.

18. The method of claim 1, further comprising:
   detecting an overlapping region where the first user-created object is overlapped with the second object; and
   modifying the first user-created object responsive to an overlapping region detection.

19. The method of claim 1, further comprising:
   tracking the second object;
   removing the second user-created object responsive to a disappearance of the tracked second object from the video image; and
   reinstating the second user-created object responsive to a reappearance of the tracked second object in the video image.

20. A method of generating effects for a webcam application, comprising the steps of:
   identifying a first object and a second object in a video image;
   adding a first user-created object to the first object to create an altered video image;
   adding a second user-created object to the second object to further alter the altered video image;
   associating the first user-created object with the first object;
   associating the second user-created object with the second object;
   identifying a movement of the first object and a movement of the second object, respectively; and
   moving the first user-created object in accordance with the association of the first user-created object with the first object.

21. The method of claim 20, further comprising:
   moving the second user-created object in accordance with the association of the second user-created object with the second object, wherein the movement of the second user-created object is independent of the movement of the first user-created object.

22. The method of claim 21, wherein an effect generated is a sound.

23. The method of claim 21, where in an effect generated is shaking the first user-created object.

24. The method of claim 20, wherein an effect generated is deformation of the first user-created object and the second user-created object.

25. The method of claim 20, further comprising:
   detecting a collision between the first user-created object and the first object, wherein a collision occurs when the first user-created object and the first object are at least contiguous.

26. The method of claim 20, further comprising:
   detecting a collision between the first user-created object and the second user-created object, wherein a collision occurs when the first user-created object and the second user-created object are at least contiguous.

27. The method of claim 20, further comprising generating an effect in response to detecting a collision.

28. The method of claim 20, wherein the movement of second object is independent of the movement of the first object.

29. The method of claim 20, further comprising:
   tracking the first object;
   removing the first user-created object from the altered video image responsive to the disappearance of the tracked first object from the video image; and
   reinstating the first user-created object responsive to the reappearance of the first object in the video image.

30. The method of claim 29, further comprising:
tracking the second object;
removing the second user-created object responsive to a disappearance of the tracked second object from the video image; and
reinstating the second user-created object responsive to a reappearance of the tracked second object in the video image.

31. A system for generating effects for a webcam application, comprising:
an identification module for identifying a first object and a second object in a video image;
an addition module for adding at least one user-created object to the video image to create an altered video image;
an association module associating the at least one user-created object with the first object;
a motion detection module for identifying a movement of the first object;
a movement module for moving the at least one user-created object in accordance with the association of the at least one user-created object with the first object in the altered video image; and
a display module for displaying the altered video image.

32. The system of claim 31, further comprising:
an effects generation module for generating effects for the at least one user-created object.

33. The system of claim 32, further comprising a collision detection module for detecting a collision between the first object and the at least one user-created object and triggering the effects generation module for generating effects.

34. The system of claim 31, further comprising a database comprising a plurality of user-created objects.

35. The system of claim 31, further comprising a user-drawing module for creating the at least one user-created object.

36. The system of claim 31, further comprising a communication system interface for sending the altered video image to another communication system interface via the Internet.

37. The system of claim 31, further comprising a tracking module for tracking the first object, removing the first user-created object when the tracked first object disappears from the video image, and reinstating the first user-created object when the tracked first object reappears in the video image.

* * * * *